United States Patent [19]

Blunck et al.

[11] Patent Number: 4,596,666
[45] Date of Patent: Jun. 24, 1986

[54] ARYL-MERCAPTO ANTHRAQUINONE DYESTUFFS, THEIR PREPARATION AND USE AND DICHROIC MATERIAL CONTAINING ARYL-MERCAPTO ANTHRAQUINONE DYESTUFFS

[75] Inventors: Martin Blunck, Cologne; Uwe Claussen, Leverkusen; Friedrich W. Kröck, Odenthal; Rütger Neeff, Leverkusen, all of Fed. Rep. of Germany

[73] Assignee: Bayer Aktiengesellschaft, Leverkusen, Fed. Rep. of Germany

[21] Appl. No.: 557,680

[22] Filed: Dec. 2, 1983

[30] Foreign Application Priority Data

Dec. 3, 1982 [DE] Fed. Rep. of Germany ....... 3244815

[51] Int. Cl.⁴ .................. C08K 5/08; C09K 3/34; G02B 1/06; D06P 1/20
[52] U.S. Cl. ..................... 252/299.01; 8/677; 8/678; 252/299.1; 252/299.62; 252/299.64; 260/369; 260/376; 260/377; 260/378; 260/380; 260/381; 260/383; 260/384; 350/349; 350/346; 350/350 R
[58] Field of Search ............... 260/377, 378, 369, 380, 260/381, 383, 384; 252/299.62, 299.1, 299.01; 8/678; 350/349

[56] References Cited

U.S. PATENT DOCUMENTS

| | | |
|---|---|---|
| 3,018,154 | 1/1962 | Downey et al. ..................... 8/512 |
| 3,164,436 | 1/1965 | Altermatt ........................... 8/543 |
| 3,337,553 | 8/1967 | Altermatt ........................... 8/650 |
| 3,894,060 | 7/1975 | Hederich et al. ................. 260/372 |
| 3,929,843 | 12/1975 | Botros ............................ 260/383 |
| 3,975,285 | 8/1976 | Ohnishi et al. ................ 252/299.3 |
| 4,008,222 | 2/1977 | Machatzke ....................... 260/380 |
| 4,232,949 | 11/1980 | Huffman ........................... 350/349 |
| 4,232,950 | 11/1980 | Benham ............................ 350/349 |
| 4,294,581 | 10/1981 | Mensch et al. ...................... 8/611 |
| 4,455,253 | 6/1984 | Thompson ...................... 252/299.1 |
| 4,496,221 | 1/1985 | Harrison et al. ................. 350/349 |
| 4,506,957 | 3/1985 | Harrison et al. ................. 350/349 |

FOREIGN PATENT DOCUMENTS

| | | |
|---|---|---|
| 74523 | 3/1983 | European Pat. Off. . |
| 2094822 | 9/1982 | United Kingdom . |
| 2093475 | 9/1982 | United Kingdom . |
| 2118203 | 10/1983 | United Kingdom . |

*Primary Examiner*—A. Lionel Clingman
*Attorney, Agent, or Firm*—Sprung Horn Kramer & Woods

[57] ABSTRACT

Anthraquinone dyestuffs of the formula

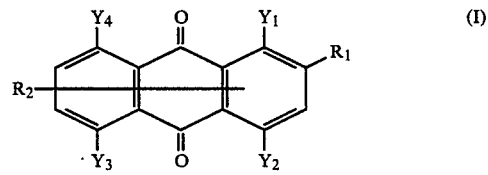

in which
$R_1$ represents alkyl, aralkyl, —CO—X-alkyl, —CO—X-aralkyl, —CO—X-aryl, —O-alkyl, —O-aralkyl, —O— aryl, —CN, —NO₂, —CF₃, halogen or a heterocyclic radical and
$R_2$ represents H or $R_1$,
X representing O, S, NH or a direct bond and
$Y_1$, $Y_2$, $Y_3$ and $Y_4$ denoting hydrogen, —NH₂, —OH, halogen, —NO₂ or an arylmercapto group and at least one of the substituents $Y_1$–$Y_4$ representing an arylmercapto group, it being also possible for the alkyl, aryl, aralkyl and heterocyclic radicals mentioned for $R_1$ and $Y_1$–$Y_4$ to be substituted, the preparation and use thereof, and dichroic material containing these anthraquinone dyestuffs.

16 Claims, No Drawings

ARYL-MERCAPTO ANTHRAQUINONE DYESTUFFS, THEIR PREPARATION AND USE AND DICHROIC MATERIAL CONTAINING ARYL-MERCAPTO ANTHRAQUINONE DYESTUFFS

The invention relates to new anthraquinone dyestuffs of the formula

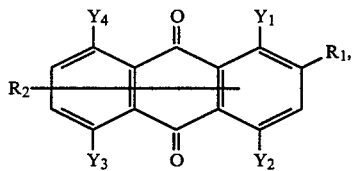

their use in dyeing, and dichroic material, preferably in the form of liquid-crystal phases, containing at least one of these anthraquinone dyestuffs.

In formula (I), $R_1$ represents alkyl, aralkyl, —CO—X—alkyl, —CO—X—aralkyl, —CO—X—aryl, —O—alkyl, —O—aralkyl, —O—aryl, CN, $NO_2$, $CF_3$, halogen or a heterocyclic radical, $R_2$ represents H or $R_1$, X representing O, S, NH or a direct bond, and $Y_1$, $Y_2$, $Y_3$ and $Y_4$ represent hydrogen, $NH_2$, OH, Hal, $NO_2$ or an arylmercapto group, and at least one of the substituents $Y_1$ to $Y_4$ denotes the arylmercapto group. The alkyl, aralkyl, aryl and heterocyclic radicals mentioned for $R_1$ and also $Y_1$-$Y_4$ can be substituted.

In particular, $Y_1$, $Y_2$, $Y_3$ and $Y_4$ represent the following combinations of four:

TABLE 1

| $Y_1$ | $Y_2$ | $Y_3$ | $Y_4$ |
|---|---|---|---|
| S—Ar | S—Ar | S—Ar | $NH_2$ |
| S—Ar | S—Ar | $NH_2$ | S—Ar |
| S—Ar | $NH_2$ | S—Ar | S—Ar |
| $NH_2$ | S—Ar | S—Ar | S—Ar |
| S—Ar | S—Ar | S—Ar | H |
| S—Ar | S—Ar | H | S—Ar |
| S—Ar | H | S—Ar | S—Ar |
| H | S—Ar | S—Ar | S—Ar |
| S—Ar | S—Ar | $NH_2$ | $NH_2$ |
| $NH_2$ | $NH_2$ | S—Ar | S—Ar |
| S—Ar | $NH_2$ | $NH_2$ | S—Ar |
| $NH_2$ | S—Ar | S—Ar | $NH_2$ |
| S—Ar | $NH_2$ | S—Ar | $NH_2$ |
| $NH_2$ | S—Ar | $NH_2$ | S—Ar |
| S—Ar | S—Ar | $NH_2$ | OH |
| S—Ar | S—Ar | OH | $NH_2$ |
| $NH_2$ | OH | S—Ar | S—Ar |
| OH | $NH_2$ | S—Ar | S—Ar |
| S—Ar | $NH_2$ | S—Ar | OH |
| $NH_2$ | S—Ar | OH | S—Ar |
| S—Ar | OH | S—Ar | $NH_2$ |
| OH | S—Ar | $NH_2$ | S—Ar |
| S—Ar | S—Ar | $NH_2$ | Hal |
| S—Ar | S—Ar | Hal | $NH_2$ |
| $NH_2$ | Hal | S—Ar | S—Ar |
| Hal | $NH_2$ | S—Ar | S—Ar |
| S—Ar | $NH_2$ | S—Ar | Hal |
| $NH_2$ | S—Ar | Hal | S—Ar |
| S—Ar | Hal | S—Ar | $NH_2$ |
| Hal | S—Ar | $NH_2$ | S—Ar |
| S—Ar | S—Ar | $NH_2$ | H |
| S—Ar | S—Ar | H | $NH_2$ |
| $NH_2$ | H | S—Ar | S—Ar |
| H | $NH_2$ | S—Ar | S—Ar |
| S—Ar | $NH_2$ | S—Ar | H |
| $NH_2$ | S—Ar | H | S—Ar |

TABLE 1-continued

| $Y_1$ | $Y_2$ | $Y_3$ | $Y_4$ |
|---|---|---|---|
| S—Ar | H | S—Ar | $NH_2$ |
| H | S—Ar | $NH_2$ | S—Ar |
| S—Ar | OH | S—Ar | OH |
| OH | S—Ar | OH | S—Ar |
| S—Ar | OH | S—Ar | Hal |
| OH | S—Ar | Hal | S—Ar |
| S—Ar | Hal | S—Ar | OH |
| Hal | S—Ar | OH | S—Ar |
| S—Ar | S—Ar | OH | H |
| S—Ar | S—Ar | H | OH |
| OH | H | S—Ar | S—Ar |
| H | OH | S—Ar | S—Ar |
| S—Ar | OH | S—Ar | H |
| OH | S—Ar | H | S—Ar |
| S—Ar | H | S—Ar | OH |
| H | S—Ar | OH | S—Ar |
| S—Ar | Hal | S—Ar | H |
| Hal | S—Ar | H | S—Ar |
| S—Ar | H | S—Ar | Hal |
| H | S—Ar | Hal | S—Ar |
| S—Ar | S—Ar | H | H |
| H | H | S—Ar | S—Ar |
| S—Ar | H | S—Ar | H |
| H | S—Ar | H | S—Ar |
| S—Ar | $NH_2$ | $NH_2$ | $NH_2$ |
| $NH_2$ | S—Ar | $NH_2$ | $NH_2$ |
| $NH_2$ | $NH_2$ | S—Ar | $NH_2$ |
| $NH_2$ | $NH_2$ | $NH_2$ | S—Ar |
| S—Ar | $NH_2$ | $NH_2$ | OH |
| $NH_2$ | S—Ar | OH | $NH_2$ |
| $NH_2$ | OH | S—Ar | $NH_2$ |
| OH | $NH_2$ | $NH_2$ | S—Ar |
| S—Ar | OH | $NH_2$ | $NH_2$ |
| OH | S—Ar | $NH_2$ | $NH_2$ |
| $NH_2$ | $NH_2$ | S—Ar | OH |
| $NH_2$ | $NH_2$ | OH | S—Ar |
| S—Ar | $NH_2$ | OH | $NH_2$ |
| $NH_2$ | S—Ar | $NH_2$ | OH |
| OH | $NH_2$ | S—Ar | $NH_2$ |
| $NH_2$ | OH | $NH_2$ | S—Ar |
| S—Ar | $NH_2$ | $NH_2$ | $NH_2$ |
| $NH_2$ | S—Ar | $NH_2$ | $NO_2$ |
| $NO_2$ | $NH_2$ | S—Ar | $NH_2$ |
| $NH_2$ | $NO_2$ | $NH_2$ | S—Ar |
| S—Ar | $NH_2$ | $NH_2$ | H |
| $NH_2$ | S—Ar | H | $NH_2$ |
| $NH_2$ | H | S—Ar | $NH_2$ |
| H | $NH_2$ | $NH_2$ | S—Ar |
| S—Ar | H | $NH_2$ | $NH_2$ |
| H | S—Ar | $NH_2$ | $NH_2$ |
| $NH_2$ | $NH_2$ | S—Ar | H |
| $NH_2$ | $NH_2$ | H | S—Ar |
| S—Ar | $NH_2$ | H | $NH_2$ |
| $NH_2$ | S—Ar | $NH_2$ | H |
| H | $NH_2$ | S—Ar | $NH_2$ |
| $NH_2$ | H | $NH_2$ | S—Ar |
| S—Ar | $NH_2$ | H | H |
| $NH_2$ | S—Ar | H | H |
| H | H | S—Ar | $NH_2$ |
| H | H | $NH_2$ | S—Ar |
| S—Ar | H | $NH_2$ | H |
| H | S—Ar | H | $NH_2$ |
| $NH_2$ | H | S—Ar | H |
| H | $NH_2$ | H | S—Ar |

In Table 1, Ar denotes aryl and Hal denotes halogen.

Possible substituents for the aryl radicals are, in particular, alkyl, such as $C_1$-$C_7$—alkyl, cycloalkyl, such as $C_3$-$C_7$—cycloalkyl, aralkyl, such as $C_1$-$C_4$—alkylaryl, trifluoromethyl, aryl, halogen, such as fluorine, chlorine or bromine, alkoxy, such as $C_1$-$C_6$—alkoxy, aryloxy, such as phenoxy and naphthyloxy, or —COOT in which T denotes an organic radical.

Examples of suitable aryl radicals are phenyl, biphenyl, naphthyl, indanyl and tetrahydronaphthyl; phenyl is preferred. Preferred substituents in the aryl radicals are $C_1$-$C_7$—alkyl, in particular methyl and tert.butyl, halogen, in particular Cl and F, phenyl and —COOT.

Alkyl preferably denotes $C_1$-$C_7$—alkyl and can optionally be substituted by halogen, such as fluorine or chlorine, $C_1$-$C_4$—alkoxy, hydroxyl, cycloalkyl, in particular cyclopentyl or cyclohexyl, or the cyano group, and/or can optionally be interrupted in the C chain by one or more O and/or S atoms.

Aralkyl denotes especially a $C_1$-$C_4$—alkylaryl radical in which the aryl radical can optionally be substituted as described above for aryl.

Heterocyclic radicals are especially optionally substituted and/or fused rings carrying 5-ring or 6-ring heterocyclic structures of the oxazole, oxdiazole, thiazole, thiadiazole, imidazole, triazole, oxazoline or dihydro-H-oxazine series.

T preferably represents a $C_1$-$C_8$—alkyl radical in which the C chain can be interrupted by O and/or S, and which can be substituted by halogen, hydroxyl, $C_1$-$C_4$—alkoxy, cycloalkyl, in particular cyclopentyl or cyclohexyl, or optionally substituted aryl, in particular optionally substituted phenyl, or T represents optionally substituted aryl, in particular optionally substituted phenyl.

Compounds of the formula (I) which are particularly important within the scope of the present invention are those in which at least one of the substituents $Y_1$, $Y_2$, $Y_3$ and $Y_4$ represents $NH_2$ and/or OH, and, additionally, at least one represents —S—aryl, and the remaining substituents, $Y_1$, $Y_2$, $Y_3$ and $Y_4$, if any, denote hydrogen.

Dyestuffs of the formula I which are also of particular interest are those in which 1–3 of the substituents $Y_1$, $Y_2$, $Y_3$ and $Y_4$ represent —$NH_2$ and/or —OH and, in addition 3-1 of the substituents $Y_1$, $Y_2$, $Y_3$ and $Y_4$ represent optionally substituted arylmercapto.

Other compounds which are particularly important are those of the formulae

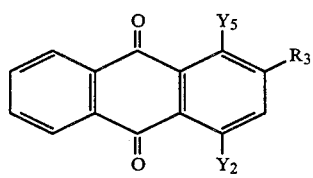 (II)

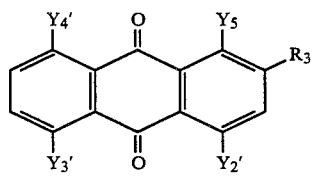 (III)

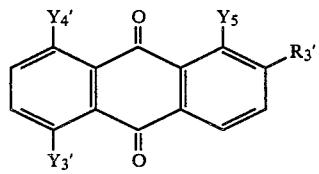 (IV)

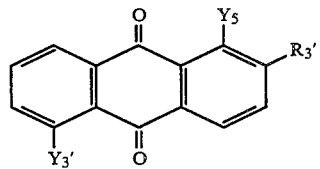 (V)

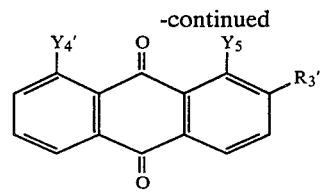 (VI)

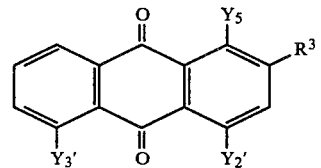 (VII)

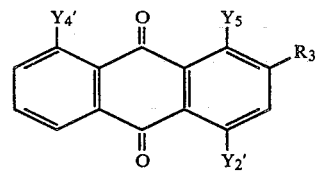 (VIII)

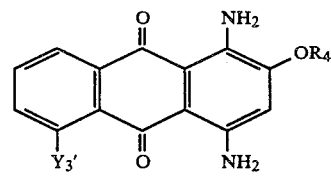 (IX)

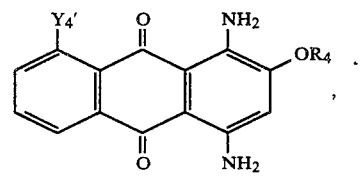 (X)

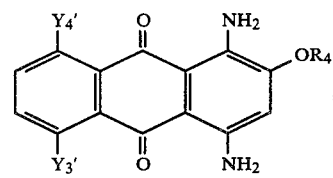 (XI)

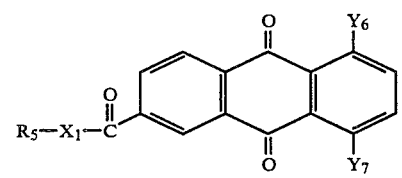 (XII)

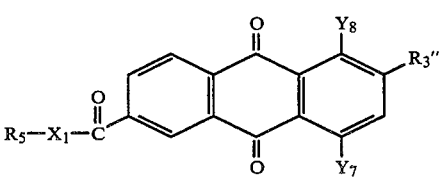 (XIII)

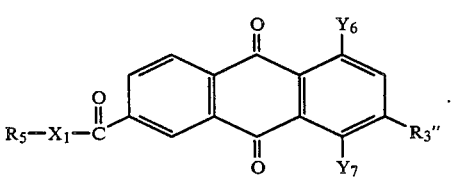 (XIV)

The individual substituents in the formulae II–XIV have the following meanings:

Y$_5$ denotes —NH$_2$, —OH or optionally substituted arylmercapto;

Y$_2'$, Y$_3'$ and Y$_4'$ denote optionally substituted arylmercapto;

X$_1$ denotes —O—, —S— or

R$_4$ and R$_5$ denote optionally substituted alkyl which can be interrupted in the C chain by one or more O and/or S atoms, or denotes optionally substituted aryl;

R$_3$ denotes optionally substituted alkyl which can be interrupted in the C chain by one or more O and/or S atoms, in particular methyl,

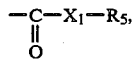

—OR$_4$ or —SR$_4$;

R$_3'$ denotes optionally substituted alkyl which can be interrupted in the C chain by one or more O and/or S atoms, in particular methyl or

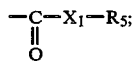

R$_3''$ denotes —OR$_4$ or —SR$_4$; and

Y$_6$ and Y$_7$ denote —NH$_2$, —OH or —SR$_4$, it being necessary for one of the two radicals Y$_6$ and Y$_7$ to be —SR$_4$.

The compounds of the formula (I) are prepared by methods which are in themselves known, such as are described, for example, in Houben-Weyl, Methoden der organischen Chemie ("Methods of Organic Chemistry"), 4th edition, 1979, G. Thieme Verlag, Stuttgart, Volume 7/3c.

The introduction of the arylmercapto radical is effected by reacting an appropriate halogenoanthraquinone or nitroanthraquinone or the corresponding anthraquinonesulphonic acid with an appropriate thiophenol or an organic solvent, for example in an alcohol or in dimethylformamide, dimethyl sulphoxide or N-methylpyrrolidone, or, when reacting an anthraquinonesulphonic acid, also in water, and in the presence of acid-binding agents, such as alkali metal carbonates, hydroxides, oxides or acetates or alkaline earth metal carbonates, hydroxides, oxides or acetates, or in the presence of organic acid-binding agents, such as triethylamine. In this reaction, if the reaction conditions are suitable, nitro groups frequently react preferentially, so that, in the case of some nitrohalogenoanthraquinones, it is possible to carry out the reaction in such a way that only the nitro groups are replaced.

The amino groups are introduced in a known manner, either by reducing a nitro group or by subjecting a corresponding halogenoanthraquinone to tosylamide fusion, followed by scission. In dinitroanthraquinones, such as 1,5-dinitro-4,8-dihydroxyanthraquinone, it is frequently possible to replace or reduce the nitro groups in stages, so that the remaining nitro group is available for further reactions.

In general, the compounds are obtained in a state of purity which is not sufficient for them to be used in liquid-crystal compositions, so that additional purification measures, such as recrystallisation, column chromatography or liquid-liquid partition, are necessary.

The invention also relates to dichroic material, preferably in the form of liquid-crystal phases, containing at least one dyestuff of the formula (I). The liquid-crystal compositions are preferably used in optoelectronic display elements.

The dyestuffs which are used in accordance with the invention possess an excellent fastness to light, a high order parameter and, to a predominant extent, a colour density in liquid-crystal materials which is sufficiently high for industrial use. The properties mentioned are of decisive importance for suitability as dyestuffs in optoelectronic display elements operating on the guest-host principle (German Offenlegungsschrift No. 3,028,593).

Optoelectronic display elements generally consist of two sheets of glass arranged parallel to one another (at a distance of 5–50μ). The liquid-crystal material is embedded between electrodes mounted on the inner sides of the glass sheets. The proper functioning of an optoelectronic display depends on the oriented structure of the liquid crystals, which can be modified by the electric field applied.

The oriented structure of the liquid-crystal materials can communicate itself to suitable dyestuffs, so that the latter participate in the structure as "guests".

The dyestuffs according to the invention are used as a solution of a nematic liquid-crystal mixture in guest-host displays of known construction and mode of operation (Heilmeyer et al, Mol. Crystals and Liquid Cryst. 8, 293–309 (1969) and German Offenlegungsschriften Nos. 2,639,675 and 2,568,568). The liquid-crystal material used as the host phase contains at least one dyestuff of the formula (I), and can also contain further dyestuffs. The latter may or may not possess dichroic properties.

The solution consists of about 0.01 to about 30% by weight, preferably about 0.1 to about 10% by weight, of dyestuff (as the guest) and of the host phase, which consists mainly of nematic, liquid-crystal material, and which can contain further additives, for example additives for achieving a cholesteric orientation.

The invention also relates, therefore, to liquid-crystal materials containing anthraquinone dyestuffs of the formula (I). The liquid-crystal material preferably has positive dielectric anisotropy and can be employed in optoelectronic display devices.

Of the various states of order of liquid-crystal materials, the nematic and cholesteric states are preferred, in accordance with the definitions, such as are stated, for example, in R. Steinsträsser and L. Pohl, Angew. Chem. 85, 706 (1973).

In the zero-field state, it is possible to distinguish two orientations of the liquid-crystal material, which depend on the property of the phase boundary and thus on the pretreatment of the glass sheets. The texture is described as homotropic or homogeneous, depending on whether the long axis of the molecules of which the liquid-crystal phase consists are oriented vertically or horizontally in relation to the surface of the sheet. The techniques for producing suitable surfaces are known (Ullmann, 4th Edition (1976), Volume XI, page 657 et seq). The dielectric anisotropy is dependent on the dipole properties of the liquid-crystal compounds. It is positive when the electric field produces a homotropic alignment and negative when this alignment becomes homogeneous. It is preferable to use this dyestuffs according to the invention in liquid-crystal materials having positive dielectric anisotropy. Examples of suitable liquid-crystal materials are mixtures containing mainly 4-cyanobiphenyls. An example is afforded by mixture E 7 of BDH Chemicals Ltd. (U.K.), or those which contain mainly 1-(4-cyanophenyl)-4-alkylcyclohexanes. An example of these is mixture ZLI 1132 of Merck (Darmstadt). Other suitable mixtures are those of the classes of substances mentioned previously with (4-cyanophenyl)-pyrimidines, for example mixture ROTN 30 of F. Hoffmann-La Roche.

Further examples of commercially available and suitable liquid-crystal mixtures which may be mentioned for positive anisotropy of dielectric constant and products based on cyanopyrimidines and cyanoesters, and also mixtures of BCH, PCH and PCH—esters and PCH, BCH, PCH—esters and terphenyl (for example "ROTN 402", "ROTN 103", "Merck 1221 TNC", "Merck 1291 TNC", "Merck 1691", and "Merck 1840").

Additionally, however, it is possible to employ a large number of other components, suitable mixtures generally being those containing the constituent mentioned. Compounds belonging to the following classes of substances are particularly suitable:

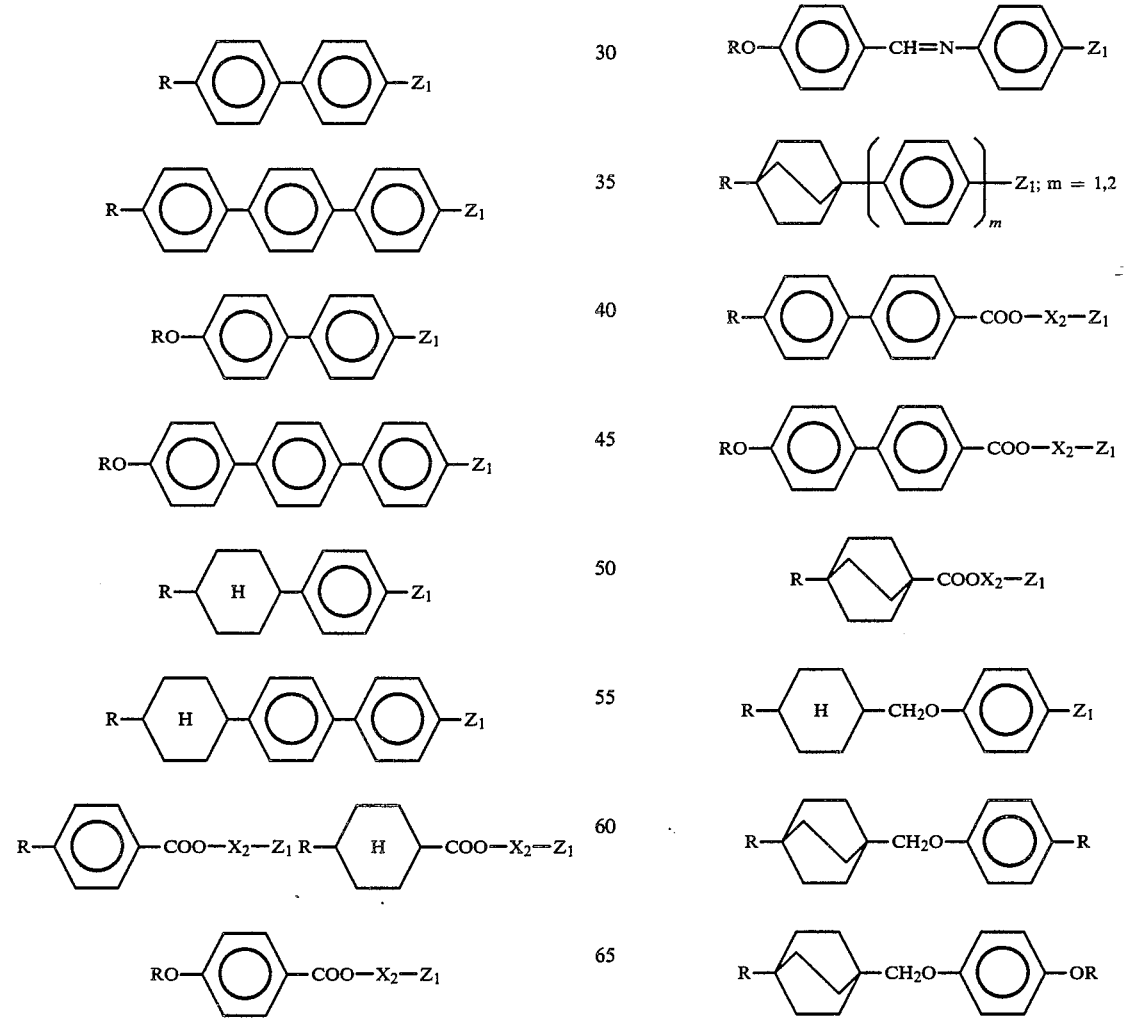

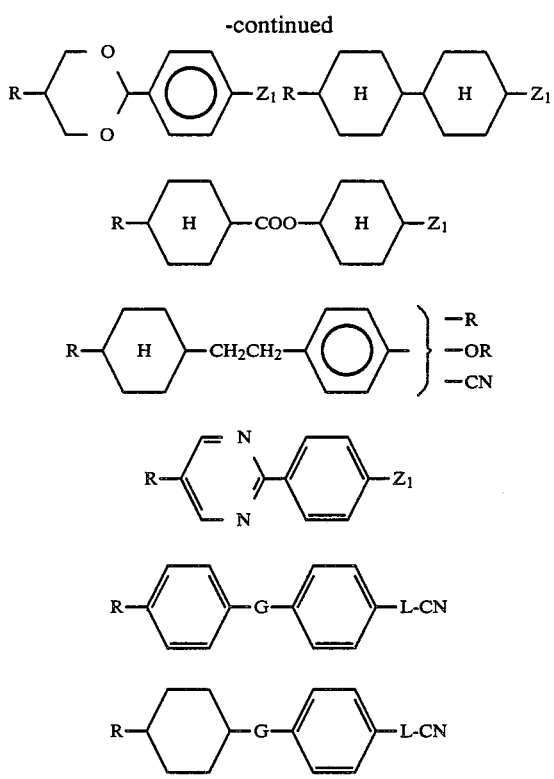

Each of the benzene rings present can be substituted by one or more substituents, for example fluorine. In these formulae R is an alkyl group, a trans-1,4-substituted cyclohexane ring or a 1,4-substituted bicyclo-[2,2,2]octane ring, $X_2$ is a 1,4-phenylene, 4,4'-biphenylene or 2,6-naphthylene group, $Z_1$ is CN, R', OR' or CO—O—$X_2$—$Z_2$, $Z_2$ is CN, R' or OR' and G and L are —CH$_2$CH$_2$—, —CH=CH— or —C≡C—.

R' has the same meaning as R.

As well as the liquid-crystal compounds and the dyestuff, the liquid-crystal material can contain further customary additives, for example optically active compounds which can convert a nematic phase into a cholesteric phase, or substances for reducing the threshold voltage etc.

The quality of the guest-host interaction can be indicated by the mean deviation of the geometrical axis of the dyestuff molecule from the preferential orientation which is determined by the molecules of the liquid-crystal material. It is possible to define an order parameter S which takes account of the mean deviation and assumes a value of 1.0 in the event of ideal order. In practice, this value is not achieved; the S values are, on the contrary, <1.0. Owing to different techniques of measurement, the values quoted in the literature are not comparable as they stand. The definition of the order parameter and its significance are described by D. L. White and G. N. Taylor, J. Appl. Phys. (5) 1974, 4718–4723, or, for example, in European Laid-Open Application 2,104. The S values of some of the claimed compounds are listed in Tables 2 and 3.

For industrial use, dyestuffs having a high order parameter are particularly valuable. However, they must have a number of other properties. Their photochemical stability must be very good and their colour shade must neither fade nor bleach in the light. In addition, they must have a good stability to chemicals in the liquid-crystal medium, which has a complex composition. Finally, the dyestuff must have a high colour density and must not crystallise even at continuing low temperatures.

It is evident that there are not many substances which fulfill the totality of all the properties in a satisfactory manner. Dichroism of light absorption as a function of the orientation of the host liquid crystals is a necessary requirement for dyestuffs to be usable.

Rendering the dyestuffs adequately soluble while maintaining their dichroic fastness and colour properties presents a particular difficulty. A large number of tests are necessary just for optimising the solubility.

Anthraquinones have already been known in the literature for a fairly long time as dichroic dyestuffs, for example from the following literature references: German Offenlegungsschrift No. 2,363,219, U.S. Pat. No. 3,864,022, U.S. Pat. No. 3,975,285, German Offenlegungsschriften Nos. 2,418,364, 2,815,335, 2,920,730, 3,006,744 and 2,082,196, European Patent No. A1-2,104, European Patent No. A1-49,035 and Japanese Patent Applications Nos. 56/112,967, 56/38,376 and 56/10,583.

All the compounds which are known from the literature prove to be in need of improvement in respect of order parameter, colour density, stability to light and/or colour stimulus specifications.

Depending on their substitution, the dyestuffs according to the invention provide yellow to blue shades of good fastness to light and tinctorial strength.

The dyestuffs which can be employed in accordance with the invention are of particular value for formulating black mixtures for liquid-crystal compositions in combination with anthraquinone and azo dyestuffs. Examples of anthraquinone dyestuffs which are suitable for such combinations are known from European Laid-Open Application No. 26,004, German Offenlegungsschriften Nos. 3,009,940 and 3,009,974, European Laid-Open Application No. 34,832 and German Offenlegungsschriften No. 2,903,095, 3,028,593, 3,036,853 and 3,038,372.

The dyestuffs according to the invention are also particularly suitable for dyeing synthetic polymers, for example fibres or plastics based on polyesters, polyamides, cellulose esters or polycarbonates, by processes which are customary per se.

In the following text, the "Colour Index Hue Indication Chart" (Society of Dyers and Colourists, U.K., and American Association of Textile Chemists and Colorists, U.S.A.) is abbreviated to "CIHIC".

EXAMPLE 1

(a) 95 g of 1-amino-2-methyl-4-bromoanthraquinone and 41 g of anhydrous potassium carbonate are introduced into 500 cc of dimethylformamide, 55 g of 4-tert.-butylthiophenol are added to the mixture, and the latter is heated to 125° to 130° C. in the course of 1 hour and is kept at this temperature until, after approx. 3 hours, the reaction is complete. After cooling to approx. 70° C., the reaction mixture is diluted with 500 cc of methanol and is allowed to cool completely. The dyestuff which has crystallised out is then filtered off with suction, washed with methanol and hot water and dried at 60° C. This gives 66 g (corresponding to 54% of theory) of 1-amino-2-methyl-4-(4-tert.-butylphenylmercapto)-anthraquinone, which is recrystallised from dimethylformamide to remove a blue by-product.

The colour shade of the dyestuff when adsorbed onto silica gel is a bluish-tinged red which has Indicator Number 10 (CIHIC).

(b) 0.5% of the dyestuff prepared in Example 1a is dissolved in a nematic phase, consisting of a mixture of approx. 24% of trans-4-heptyl-(4-cyanophenyl)-cyclohexane, 37% of trans-4-pentyl-(4-cyanophenyl)-cyclohexane, 26% of trans-4-propyl-(4-cyanophenyl)-cyclohexane and 12% of trans-4-pentyl-(4'-cyanobiphenylyl)-cyclohexane. This gives a liquid-crystal mixture which has a bluish-tinged red colour and in which the dyestuff has an order parameter S of 0.69.

(c) 0.5% of the dyestuff prepared in Example 1a is dissolved in a liquid-crystal phase consisting of 51% of 4'-n-pentyl-4-cyanobiphenyl, 25% of 4'-n-heptyl-4-cyanobiphenyl, 16% of 4'-n-octyl-4-cyanobiphenyl and 8% of 4''-n-pentyl-4-cyanoterphenyl. This gives a liquid-crystal mixture which has a bluish-tinged red colour and in which the dyestuff has an order parameter S of 0.70.

Similar good order parameters are also obtained if other liquid-crystal mixtures are employed, for example those described in pages 12–15.

EXAMPLE 2

(a) 6.8 g of 1-amino-2-(4,5-dihydrooxazol-2-yl)-4-nitroanthraquinone and 2.7 g of anhydrous potassium carbonate are introduced into 50 cc of N-methylpyrrolidone, 3.7 g of 4-tert.-butylthiophenyl are added to the mixture, and the latter is heated to 80° C. in the course of 1 hour and is kept at this temperature until the orange-red starting material has reacted completely. The reaction mixture is then diluted at 70° C. with 50 cc of methanol and is allowed to cool to room temperature. The dyestuff which has crystallised out is filtered off with suction, washed with methanol and hot water and dried at 60° C. This gives 6.9 g (corresponding to 75% of theory) of 1-amino-(2-(4,5-dihydrooxazol-2-yl)-4-(4-tert.-butylphenylmercapto)-anthraquinone, which is recrystallised from 100 cc of dimethylformamide and washed with ethanol.

The colour shade of the dyestuff when adsorbed onto silica gel is a bluish-tinged violet which is between Indicator Numbers 12 and 13 (CIHIC).

(b) In a 0.5% strength, bluish-tinged violet solution of the dyestuff described above in one of the liquid-crystal phases of Examples 1b or 1c, the dyestuff has an order parameter S of 0.75. Similar good order parameters are also obtained if other liquid-crystal mixtures are employed, for example those described on pages 12–15.

(c) The 1-amino-2-(4,5-dihydrooxazol-2-yl)-4-nitroanthraquinone employed in Example 2a can be prepared as follows:

34 g of 1-amino-4-nitroanthraquinone-2-carboxylic acid N-(2-methoxyethyl)-amide, prepared from 1-amino-4-nitroanthraquinone-2-carboxylic acid chloride and 2-methoxyethylamine, are introduced in 400 cc of 100% strength sulphuric acid, and the solution is warmed at 50° C. until cyclisation is complete. After cooling, the reaction mixture is poured onto 3 kg of ice, and the product is filtered off with suction and washed until neutral. The dry substance weighs 22 g, corresponding to a yield of 70% of theory. It is recrystallised from dimethylformamide.

EXAMPLE 3

(a) 14 g of 1-amino-2-(5,6-dihydro-4H-1,3-oxazin-2-yl)-4-nitroanthraquinone, 5.4 g of potassium carbonate, 100 cc of N-methylpyrrolidone and 5.9 g of 4-chlorothiophenol are reacted as in Example 2. The reaction mixture is worked up as described in that example to give 9.2 g of 1-amino-2-(5,6-dihydro-4H-1,3-oxazin-2-yl)-4-(4-chlorophenylmercapto)-anthraquinone, corresponding to a yield of 51% of theory.

The colour shade of the dyestuff when adsorbed onto silica gel is a bluish-tinged violet which is between Indicator Numbers 12 and 13.

(b) In one of the liquid-crystal phases of Examples 1b or 1c, the dyestuff described above has a blue-violet colour in solution and an order parameter S of 0.73.

(c) The 1-amino-2-(5,6-dihydro-4H-1,3-oxazin-2-yl)-4-nitroanthraquinone employed in Example 2a can be prepared from 1-amino-4-nitroanthraquinone-2-carboxylic acid N-(3-methoxypropyl)-amide analogously to the instructions in Example 2c.

EXAMPLE 4

(a) 4.1 g of 4-methylthiophenol are added to a suspension of 11.6 g of phenyl 1-amino-4-nitroanthraquinone-2-carboxylate, prepared from 1-amino-4-nitroanthraquinone-2-carboxylic acid chloride and phenol, and 4.2 g of potassium carbonate (anhydrous) in 50 cc of N-methylpyrrolidone, and the mixture is stirred at 80° C. until the starting material has reacted completely. The reaction mixture is diluted at 40° C. with 20 cc of water. After cooling to room temperature, the crystals which have separated out are filtered off with suction, washed with a mixture of N-methylpyrrolidone and water and then with hot water and dried at 60° C. This gives 7.2 g (corresponding to 53% of theory) of phenyl 1-amino-4-(4-methylphenylmercapto)-anthraquinone-2-carboxylate, which can be purified by recrystallisation from dimethylformamide.

The colour shade of the dyestuff when adsorbed onto silica gel is a bluish-tinged violet which is between Indicator Numbers 12 and 13 (CIHIC).

(b) A 0.5% strength solution of the dyestuff described above in one of the liquid-crystal phases of Examples 1b or 1c has a bluish-tinged violet colour. The order parameter S of the dyestuff is found to be 0.75 or 0.74.

Similar good order parameters are also obtained in other liquid-crystal mixtures, for example those described on pages 12–15.

EXAMPLE 5

(a) 11.6 g of phenyl 1-amino-4-nitroanthraquinone-2-carboxylate (see Example 3a), 4.2 g of potassium carbonate (anhydrous) and 4.8 g of 4-chlorothiophenol are introduced into 50 cc of N-methylpyrrolidone, and the mixture is heated at 80° C. until the starting material has reacted completely. The mixture is then diluted at 70° C. with 50 cc of methanol and is allowed to cool. The crystals which have separated out are filtered off with suction, washed with methanol and hot water and dried. This gives 8.3 g, corresponding to 65% of theory, of methyl 1-amino-4-(4-chlorophenylmercapto)-anthraquinone-2-carboxylate, which has been formed by reacting the phenyl ester with the methanol used for the precipitation. The dyestuff can be purified by recrystallisation from dimethylformamide.

The colour shade of the dyestuff when adsorbed onto silica gel is a bluish-tinged violet which is between Indicator Numbers 12 and 13 (CIHIC).

(b) In one of the liquid-crystal phases of Examples 1b or 1c, the dyestuff described above has a bluish-tinged violet colour in solution and an order parameter S of 0.74.

EXAMPLE 6

(a) 7.7 g of pentyl 1-amino-4-nitroanthraquinone-2-carboxylate, prepared from 1-amino-4-nitroanthraquinone-2-carboxylic acid chloride and n-pentanol, 2.7 g of anhydrous potassium carbonate and 2.7 g of 4-methylthiophenol are introduced into 50 cc of N-methylpyrrolidone, and the mixture is heated to 125°–130° C. in the course of 1 hour and is stirred at this temperature until, after about 1.5 hours, complete reaction has been achieved. The reaction mixture is allowed to cool and is diluted at 40° C. with 20 cc of water. When the mixture has cooled completely, the dyestuff which has been precipitated is filtered off with suction and washed with a mixture of N-methylpyrrolidone and water and then with hot water. After drying at 60° C., 6.7 g of n-pentyl 1-amino-4-(4-methylphenylmercapto)-anthraquinone-2-carboxylate are obtained, corresponding to a yield of 72% of theory. The dyestuff can be purified by recrystallisation from dimethylformamide.

The colour shade of the dyestuff when adsorbed onto silica gel is a bluish-tinged violet which is between Indicator Numbers 12 and 13 (CIHIC).

(b) When dissolved in one of the liquid-crystal phases of Examples 1b or 1c, the dyestuff described above has an order parameter S of 0.74. The solution has a blue-violet colour.

EXAMPLE 7

(a) If the 4-methylthiophenol in Example 5 is replaced by 4.9 g of n-pentyl 3-mercaptobenzoate, prepared analogously to the instructions of P. F. Wiley (J. Org. Chem. 16, (1951), 812) for the methyl and ethyl esters, the procedure otherwise being as described in that example, 6.1 g of n-pentyl 1-amino-4-(3-pentoxycarbonylphenylmercapto)-anthraquinone-2-carboxylate, corresponding to a yield of 54% of theory, are obtained after a reaction time of 3 hours at 125°–130° C. and appropriate working up.

The colour shade of the dyestuff when adsorbed onto silica gel is a bluish-tinged violet which is between Indicator Numbers 12 and 13 (CIHIC).

(b) The dyestuff described above imparts a blue-violet colour to a liquid-crystal phase such as was used in Examples 1b or 1c, and, in these phases, has an order parameter S of 0.74.

(c) n-Pentyl 1-amino-4-(4-methoxycarbonylphenylmercapto)-anthraquinone-2-carboxylate, which is readily soluble in the liquid-crystal phases of Examples 1b or 1c, giving a blue-violet colour, and has an order parameter S of 0.74 in these phases, is obtained entirely analogously to the procedure described in (a) from methyl 4-mercaptobenzoate, which is also described by P. F. Wiley (J. Org. Chem. 16 (1951), 813), but which can also be synthesized from the 4-mercaptobenzoic acid prepared by S. Smiles and D. C. Harrison (J. Chem. Soc. (London) 121 (1922), 2024) (in this connection see also the communication from D. Bramley and N. H. Chamberlain in J. Chem. Soc. (London) 1942, 376).

EXAMPLE 8

(a) 7.8 g of n-propyl 1-amino-4-bromoanthraquinone-2-carboxylate, 2.7 g of anhydrous potassium carbonate and 3.7 g of 4-tert.-butylthiophenol are introduced into 50 cc of N-methylpyrrolidone, and the mixture is heated to 125°–130° C. in the course of 1 hour. The reaction mixture is stirred at this temperature until the starting material has reacted, and is then diluted at 40° C. with 20 cc of water. When the mixture has cooled completely, it is filtered with suction and the product is washed with a mixture of N-methylpyrrolidone and water and then with hot water, and dried at 60° C. This gives 5.5 g of n-propyl 1-amino-4-(4-tert.-butylphenylmercapto)-anthraquinone-2-carboxylate, corresponding to a yield of 57% of theory.

The colour shade of the dyestuff when adsorbed onto silica gel is a bluish-tinged violet which is between Indicator Numbers 12 and 13 (CIHIC).

(b) The dyestuff described above imparts a blue-violet colour to a liquid-crystal phase such as was used in Examples 1b or 1c, and has an order parameter S of 0.71 in these phases. Similar good order parameters are also obtained in other liquid-crystal mixtures, for example those described on pages 12-15.

EXAMPLE 9

(a) If the 4-methylthiophenol in Example 4 is replaced by 6.2 g of 4-phenylthiophenol, prepared from 4-biphenylsulphonic acid, which is known from the literature, by converting the latter into the sulphonyl chloride and reducing this by the method of A. W. Wagner (Chem. Ber. 99, (1966), 375) using red phosphorus and iodine in glacial acetic acid, the procedure otherwise being as described above, after appropriate working up, 9.5 g of phenyl 1-amino-4-(4-biphenylmercapto)-anthraquinone-2-carboxylate (60% of theory) are obtained; this can be purified by recrystallisation from dimethylformamide.

The colour shade of the dyestuff when adsorbed onto silica gel is a bluish-tinged violet which is between Indicators Numbers 12 and 13 (CIHIC).

(b) In one of the liquid-crystal phases of Examples 1b or 1c, the dyestuff described above has a blue-violet colour in solution and an order parameter S of 0.78.

EXAMPLE 10

(a) 4.5 g of phenyl 1-amino-4,5,8-trichloroanthraquinone-2-carboxylate and 2 g of anhydrous potassium carbonate are introduced into 100 cc of dimethylformamide, 4 g of 4-methylthiophenol are added, and the mixture is then heated to 80° C. under a gentle stream of nitrogen and is kept at this temperature until the reaction is complete. The reaction mixture is then diluted at 40° C. with 40 cc of water, is allowed to cool completely and is filtered with suction, and the product is washed with a mixture of dimethylformamide and water and then with water. After drying at 60° C., 4.8 g of phenyl 1-amino-4,5,8-tri-(4-methylphenylmercapto)-anthraquinone-2-carboxylate are obtained, corresponding to a yield of 67% of theory.

The colour shade of the dyestuff when adsorbed onto silica gel is a reddish-tinged blue which is between Indicator Numbers 13 and 14 (CIHIC).

(b) The dyestuff described above imparts a blue colour to a liquid-crystal phase such as was used in Examples 1b or 1c, and has an order parameter S of 0.81 in this phase.

(c) The phenyl 1-amino-4,5,8-trichloroanthraquinone-2-carboxylate employed in Example 10a had been prepared as follows:

A mixture of 60 g of phenol and 4 g of anhydrous potassium carbonate is subjected to incipient vacuum distillation, in the course of which approx. 20 g of phenol and water are removed by distillation. 15.6 g of 1-amino-4,5,8-trichloroanthraquinone-2-carboxylic acid chloride, prepared from 1-amino-4,5,8-trichloroanthraquinone-2-carboxylic acid, described in German Auslegeschrift No. 1,154,490, Example 15, and excess thionyl chloride, are introduced to the cold melt, and the mixture is then heated at 60° C. for 30 minutes. It is then diluted at about 40° C. with 20 cc of water, is allowed to cool completely and is filtered with suction, and the product is washed with water and dried. This gives 12.2 g of the product, corresponding to a yield of 68% of theory.

(d) Pentyl 1-amino-4,5,8-tri-(4-methylphenylmercapto)-anthraquinone-2-carboxylate, which is also soluble in the liquid-crystal phases used in Example 1b or 1c, producing a reddish-tinged blue colour, and which has an order parameter of 0.79 therein, is obtained, entirely analogously to the procedure described under (a), from the analogous pentyl ester, prepared in accordance with (c) from pentanol and 1-amino-4,5,8-trichloroanthraquinon-2-carboxylic acid chloride.

EXAMPLE 11

(a) 7.9 g of 1-amino-4-nitroanthraquinone-2-carboxylic acid N-(n-hexyl)-amide and 2.7 g of anhydrous potassium carbonate are introduced into 50 cc of N-methylpyrrolidone, 2.7 g of 4-methylthiophenol are added, and the mixture is heated at 80° C. until the reaction is complete. The mixture is then diluted at 70° C. with 50 cc of methanol, is allowed to cool and is filtered with suction, and the product is washed with methanol and water. This gives 6.0 g of 1-amino-4-(4-methylphenylmercapto)-anthraquinone-2-carboxylic acid N-(n-hexyl)-amide, corresponding to a yield of 63% of theory.

The colour shade of the dyestuff when adsorbed onto silica gel is a violet which is between Indicator Numbers 11 and 12 (CIHIC).

(b) The dyestuff described above imparts a violet colour to a liquid-crystal phase such as was used in Examples 1b or 1c, and has an order parameter S of 0.75 in this phase.

(c) The 1-amino-4-nitroanthraquinone-2-carboxylic acid N-(n-hexyl)-amide employed in Example 11a can be prepared from 1-amino-4-nitroanthraquinone-2-carboxylic acid by reacting the latter with excess thionyl chloride, distilling off the thionyl chloride and reacting the distillation residue with n-hexylamine.

EXAMPLE 12

1,4-Dichloroanthraquinone-6-carboxylic acid, which is described in Houben-Weyl, Methoden der organischen Chemie ["Methods of Organic Chemistry"], 4th Edition, 1979, G. Thieme Verlag, Stuttgart, Volume 7/3C, page 261, can also be converted, entirely analogously to the process described in Example 10, via its acid chloride into the corresponding n-pentyl ester or phenyl ester or a carboxamide, for example N-(n-hexyl)-carboxamide. The two chlorine atoms are then replaced by arylmercapto radicals in the manner described. This gives red compounds having the following order parameters:

(a) n-Pentyl 1,4-di-(4-chlorophenylmercapto)-anthraquinone-6-carboxylate, S=0.76

(b) Phenyl 1,4-diphenylmercaptoanthraquinone-6-carboxylate, S=0.75

(c) 1,4-Di-(4-methylphenylmercapto)-anthraquinone-6-carboxylic acid N-(n-hexyl)-amide, S=0.78

(d) 1,4-Di-(4-methylphenylmercapto)-anthraquinone-6-carboxylic acid anilide, S=0.79.

Further examples are listed in Table 2 which follows. The table relates to dyestuffs of the formula

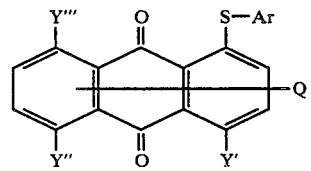

In this formula, Q indicates the β-substituents; X in the table designates the position in which Q is attached to the anthraquinone ring, that is to say the 2-, 3-, 6- or 7-position.

The order parameter in the nematic phases of Examples 1b or 1c is indicated in columns $S_1$, $S_2$, $S_3$ and $S_4$. The data are determined in a 0.5% strength solution at a layer thickness of 23 μm, and are evaluated in accordance with the known procedure (for example British Patent Specification No. 2,071,685). The order parameters indicated in the table have the following meanings in column $S_1$, they relate to dyestuffs in which Ar denotes phenyl;

in column $S_2$, they relate to dyestuffs in which Ar denotes 4-chlorophenyl;

in column $S_3$ they relate to dyestuffs in which Ar denotes 4-methylphenyl; and in column $S_4$, they relate to dyestuffs in which Ar denotes 4-tert.-butylphenyl.

Under the heading Q, $C_6H_5$ represents phenyl, $C_6H_4$ represents phenylene, $C_3H_7$ represents n-propyl, $C_4H_9$ represents n-butyl and $C_5H_{11}$ represents n-pentyl.

The numbers marked with dashes and placed in brackets denote the position, on the phenoxy radical, of the following substituent.

TABLE 2

| | Y' | Y'' | Y''' | X | Q | $S_1$ | $S_2$ | $S_3$ | $S_4$ |
|---|---|---|---|---|---|---|---|---|---|
| 1 | S—Ar | S—Ar | S—Ar | (2) | $CH_3$ | | 0.73 | 0.72 | |
| 2 | S—Ar | S—Ar | S—Ar | (2) | $CH_2CH(CH_3)_2$ | 0.68 | 0.79 | 0.78 | 0.74 |
| 3 | S—Ar | S—Ar | S—Ar | (2) | 2-Oxazolinyl | 0.68 | 0.79 | 0.78 | 0.74 |
| 4 | S—Ar | S—Ar | S—Ar | (2) | $CONHC_6H_5$ | 0.69 | 0.79 | 0.78 | 0.74 |
| 5 | S—Ar | S—Ar | S—Ar | (2) | $COOCH_3$ | 0.66 | 0.77 | 0.76 | 0.72 |
| 6 | S—Ar | S—Ar | S—Ar | (2) | $COOC_3H_7$ | | 0.75 | 0.74 | |

TABLE 2-continued

|    | Y'   | Y''  | Y'''            | X   | Q                                                      | $S_1$ | $S_2$ | $S_3$ | $S_4$ |
|----|------|------|-----------------|-----|--------------------------------------------------------|-------|-------|-------|-------|
| 7  | S—Ar | S—Ar | S—Ar            | (2) | $COOC_5H_{11}$                                         |       | 0.76  | 0.75  | 0.71  |
| 8  | S—Ar | S—Ar | S—Ar            | (2) | $COOC_6H_5$                                            | 0.71  | 0.81  | 0.80  | 0.76  |
| 9  | S—Ar | S—Ar | S—Ar            | (2) | $COOC_6H_4(4')CH_3$                                    | 0.72  | 0.81  | 0.81  | 0.77  |
| 10 | S—Ar | S—Ar | S—Ar            | (2) | $COOC_6H_4(4')OCH_3$                                   | 0.72  | 0.82  | 0.81  | 0.77  |
| 11 | S—Ar | S—Ar | S—Ar            | (2) | $COOC_6H_4(4')COOC_5H_{11}$                            | 0.71  | 0.81  | 0.80  | 0.76  |
| 12 | S—Ar | S—Ar | S—Ar            | (2) | $COOC_6H_4(4')C_6H_5$                                  | 0.73  | 0.82  | 0.82  | 0.78  |
| 13 | S—Ar | S—Ar | S—Ar            | (2) | $OCH_3$                                                |       |       | 0.72  |       |
| 14 | S—Ar | S—Ar | S—Ar            | (2) | $OC_4H_9$                                              |       | 0.75  | 0.74  | 0.69  |
| 15 | S—Ar | S—Ar | S—Ar            | (2) | $OCH_2C_6H_5$                                          |       | 0.75  | 0.74  | 0.69  |
| 16 | S—Ar | S—Ar | S—Ar            | (2) | $O(CH_2)_2C_6H_5$                                      | 0.65  | 0.76  | 0.76  | 0.71  |
| 17 | S—Ar | S—Ar | S—Ar            | (2) | $OC_6H_5$                                              | 0.69  | 0.79  | 0.79  | 0.75  |
| 18 | S—Ar | S—Ar | S—Ar            | (2) | $OC_6H_4(2')Cl$                                        | 0.70  | 0.80  | 0.79  | 0.75  |
| 19 | S—Ar | S—Ar | S—Ar            | (2) | $OC_6H_4(3')Cl$                                        | 0.71  | 0.80  | 0.80  | 0.76  |
| 20 | S—Ar | S—Ar | S—Ar            | (2) | $OC_6H_4(3')F$                                         | 0.70  | 0.80  | 0.79  | 0.75  |
| 21 | S—Ar | S—Ar | S—Ar            | (2) | $OC_6H_4(4')CH_3$                                      | 0.70  | 0.80  | 0.79  | 0.75  |
| 22 | S—Ar | S—Ar | S—Ar            | (2) | $OC_6H_4(4')C_6H_5$                                    | 0.71  | 0.81  | 0.80  | 0.76  |
| 23 | S—Ar | S—Ar | S—Ar            | (2) | $OC_6H_4(4')SCH_3$                                     | 0.69  | 0.79  | 0.79  | 0.75  |
| 24 | S—Ar | S—Ar | S—Ar            | (2) | $OC_6H_4(4')COOC_2H_5$                                 | 0.69  | 0.79  | 0.79  | 0.75  |
| 25 | S—Ar | S—Ar | S—Ar            | (2) | $OC_6H_4(4')COOC_5H_{11}$                              | 0.69  | 0.79  | 0.78  | 0.74  |
| 26 | S—Ar | S—Ar | S—Ar            | (2) | $OC_6H_4(4')Cl$                                        | 0.69  | 0.79  | 0.78  | 0.74  |
| 27 | S—Ar | S—Ar | S—Ar            | (2) | O—2-Naphthyl                                           |       | 0.80  | 0.80  | 0.76  |
| 28 | S—Ar | S—Ar | S—Ar            | (2) | CN                                                     | 0.62  | 0.74  |       | 0.68  |
| 29 | S—Ar | S—Ar | S—Ar            | (2) | Br                                                     |       | 0.74  |       | 0.68  |
| 30 | S—Ar | S—Ar | S—Ar            | (2) | Cl                                                     |       | 0.73  |       |       |
| 31 | S—Ar | S—Ar | $NH_2$          | (7) | $CH_3$                                                 | 0.69  | 0.77  | 0.76  | 0.73  |
| 32 | S—Ar | S—Ar | $NH_2$          | (7) | 2-Oxazolinyl                                           |       | 0.81  | 0.81  | 0.78  |
| 33 | S—Ar | S—Ar | $NH_2$          | (7) | $CONHC_6H_5$                                           | 0.75  | 0.82  | 0.81  |       |
| 34 | S—Ar | S—Ar | $NH_2$          | (7) | $COOC_5H_{11}$                                         |       | 0.79  |       | 0.76  |
| 35 | S—Ar | S—Ar | $NH_2$          | (7) | $COOC_6H_5$                                            | 0.77  | 0.82  |       | 0.81  |
| 36 | S—Ar | S—Ar | $NH_2$          | (7) | $COOC_6H_4(3')CH_3$                                    | 0.78  | 0.82  | 0.82  | 0.81  |
| 37 | S—Ar | S—Ar | $NH_2$          | (7) | $COOC_6H_4(4')COOC_5H_{11}$                            | 0.77  | 0.82  | 0.82  | 0.80  |
| 38 | S—Ar | S—Ar | $NH_2$          | (7) | $COOC_6H_4(4')C_6H_5$                                  | 0.79  | 0.83  | 0.82  | 0.82  |
| 39 | S—Ar | S—Ar | $NH_2$          | (7) | $OC_4H_9$                                              | 0.71  |       | 0.78  | 0.75  |
| 40 | S—Ar | S—Ar | $NH_2$          | (7) | $O(CH_2)_2C_6H_5$                                      |       | 0.80  | 0.79  | 0.76  |
| 41 | S—Ar | S—Ar | $NH_2$          | (7) | $OC_6H_5$                                              | 0.76  | 0.82  | 0.82  | 0.79  |
| 42 | S—Ar | S—Ar | $NH_2$          | (7) | $OC_6H_4(4')OCH_3$                                     | 0.77  | 0.82  | 0.82  | 0.80  |
| 43 | S—Ar | S—Ar | $NH_2$          | (7) | $OC_6H_4(4')C_6H_5$                                    | 0.77  | 0.82  | 0.82  |       |
| 44 | S—Ar | S—Ar | $NH_2$          | (7) | $OC_6H_4(4') COOC_5H_{11}$                             |       | 0.82  | 0.81  | 0.79  |
| 45 | S—Ar | S—Ar | $NH_2$          | (7) | CN                                                     |       | 0.77  | 0.77  |       |
| 46 | S—Ar | S—Ar | $NH_2$          | (2) | $CH_2CH(CH_3)_2$                                       |       | 0.82  |       |       |
| 47 | S—Ar | S—Ar | $NH_2$          | (2) | $CONHC_6H_4(4')CH_3$                                   | 0.75  | 0.82  | 0.81  |       |
| 48 | S—Ar | S—Ar | $NH_2$          | (2) | $COOC_5H_{11}$                                         |       | 0.79  | 0.79  | 0.76  |
| 49 | S—Ar | S—Ar | $NH_2$          | (2) | $COOC_6H_5$                                            | 0.77  |       | 0.82  | 0.81  |
| 50 | S—Ar | S—Ar | $NH_2$          | (2) | $COOC_6H_4(3')CH_3$                                    |       | 0.82  | 0.82  |       |
| 51 | S—Ar | S—Ar | $NH_2$          | (2) | $OC_6H_5$                                              | 0.76  | 0.82  | 0.82  |       |
| 52 | S—Ar | S—Ar | $NH_2$          | (2) | $OC_6H_4(3')F$                                         |       | 0.82  | 0.82  | 0.80  |
| 53 | S—Ar | S—Ar | $NH_2$          | (2) | $OC_6H_4(4')COOC_2H_5$                                 | 0.76  | 0.82  |       |       |
| 54 | S—Ar | S—Ar | $NH_2$          | (2) | O—2-Naphthyl                                           |       | 0.82  | 0.82  | 0.80  |
| 55 | S—Ar | S—Ar | $NH_2$          | (2) | CN                                                     |       | 0.77  |       | 0.74  |
| 56 | S—Ar | S—Ar | $NH_2$          | (2) | Cl                                                     |       | 0.77  |       |       |
| 57 | S—Ar | S—Ar | $NH_2$          | (3) | $CH_3$                                                 |       | 0.77  | 0.76  |       |
| 58 | S—Ar | S—Ar | $NH_2$          | (3) | 2-Oxazolinyl                                           |       | 0.81  |       |       |
| 59 | S—Ar | S—Ar | $NH_2$          | (3) | $CONHC_6H_5$                                           | 0.75  | 0.82  | 0.81  | 0.79  |
| 60 | S—Ar | S—Ar | $NH_2$          | (3) | $COOC_5H_{11}$                                         | 0.72  | 0.79  | 0.79  | 0.76  |
| 61 | S—Ar | S—Ar | $NH_2$          | (3) | $COOC_6H_5$                                            | 0.77  | 0.82  |       | 0.81  |
| 62 | S—Ar | S—Ar | $NH_2$          | (3) | $OCH_3$                                                | 0.69  | 0.77  | 0.76  |       |
| 63 | S—Ar | S—Ar | $NH_2$          | (3) | $OC_6H_5$                                              | 0.76  | 0.82  |       | 0.79  |
| 64 | S—Ar | S—Ar | $NH_2$          | (3) | $OC_6H_4(4')COOC_5H_{11}$                              |       | 0.82  | 0.81  | 0.79  |
| 65 | S—Ar | S—Ar | $NH_2$          | (3) | CN                                                     |       | 0.77  |       |       |
| 66 | S—Ar | S—Ar | H               | (2) | $CF_3$                                                 | 0.69  | 0.78  | 0.77  |       |
| 67 | S—Ar | S—Ar | H               | (2) | 2-Oxazolinyl                                           | 0.74  | 0.81  | 0.80  |       |
| 68 | S—Ar | S—Ar | H               | (2) | $CONHC_6H_4(4')C_6H_5$                                 | 0.74  | 0.81  | 0.81  | 0.78  |
| 69 | S—Ar | S—Ar | H               | (2) | $COOC_5H_{11}$                                         |       | 0.78  | 0.78  |       |
| 70 | S—Ar | S—Ar | H               | (2) | $COOC_6H_5$                                            | 0.76  | 0.82  | 0.82  | 0.80  |
| 71 | S—Ar | S—Ar | H               | (2) | $COOC_6H_4(4')CH_3$                                    | 0.77  | 0.82  | 0.82  | 0.80  |
| 72 | S—Ar | S—Ar | H               | (2) | $COOC_6H_4(4')Cl$                                      |       | 0.82  | 0.82  | 0.80  |
| 73 | S—Ar | S—Ar | H               | (2) | $COOC_6H_4(4')COOC_5H_{11}$                            |       | 0.82  | 0.82  | 0.80  |
| 74 | S—Ar | S—Ar | H               | (2) | $COOC_6H_4(4')C_6H_5$                                  | 0.78  | 0.82  | 0.82  | 0.81  |
| 75 | S—Ar | S—Ar | H               | (2) | $OC_4H_9$                                              |       | 0.77  |       | 0.74  |
| 76 | S—Ar | S—Ar | H               | (2) | $OC_6H_5$                                              | 0.75  | 0.81  | 0.81  | 0.78  |
| 77 | S—Ar | S—Ar | H               | (2) | $OC_6H_4(2')Cl$                                        |       | 0.82  |       |       |
| 78 | S—Ar | S—Ar | H               | (2) | $OC_6H_4(3')CH_3$                                      |       |       | 0.81  |       |
| 79 | S—Ar | S—Ar | H               | (2) | $OC_6H_4(3')F$                                         |       | 0.82  | 0.81  | 0.79  |
| 80 | S—Ar | S—Ar | H               | (2) | $OC_6H_4(4')CH_3$                                      |       | 0.82  | 0.81  | 0.79  |
| 81 | S—Ar | S—Ar | H               | (2) | $OC_6H_4(4')C_6H_5$                                    | 0.76  | 0.82  | 0.82  |       |
| 82 | S—Ar | S—Ar | H               | (2) | $OC_6H_4(4')COOC_2H_5$                                 | 0.75  |       | 0.81  |       |
| 83 | S—Ar | S—Ar | H               | (2) | $OC_6H_4(4')COOC_5H_{11}$                              |       | 0.81  |       | 0.78  |
| 84 | S—Ar | S—Ar | H               | (2) | O 2-Naphthyl                                           | 0.76  | 0.82  |       | 0.79  |
| 85 | S—Ar | S—Ar | H               | (2) | CN                                                     |       | 0.76  | 0.76  | 0.73  |
| 86 | S—Ar | S—Ar | H               | (2) | Cl                                                     |       | 0.75  |       |       |
| 87 | S—Ar | S—Ar | H               | (3) | $CH_2CH(CH_3)_2$                                       |       | 0.81  |       | 0.78  |

TABLE 2-continued

|  | Y' | Y'' | Y''' | X | Q | S₁ | S₂ | S₃ | S₄ |
|---|---|---|---|---|---|---|---|---|---|
| 88 | S—Ar | S—Ar | H | (3) | $COOC_5H_{11}$ | 0.71 |  | 0.78 | 0.75 |
| 89 | S—Ar | S—Ar | H | (3) | $COOC_6H_5$ | 0.76 | 0.82 | 0.82 |  |
| 90 | S—Ar | S—Ar | H | (3) | $COOC_6H_4(4')Cl$ | 0.76 | 0.82 |  | 0.80 |
| 91 | S—Ar | S—Ar | H | (3) | $COOC_6H_4(4')COOC_5H_{11}$ |  | 0.82 | 0.82 | 0.80 |
| 92 | S—Ar | S—Ar | H | (3) | $COOC_6H_4(4')C_6H_5$ | 0.78 | 0.82 |  | 0.81 |
| 93 | S—Ar | S—Ar | H | (3) | $OCH_3$ |  | 0.76 | 0.75 |  |
| 94 | S—Ar | S—Ar | H | (3) | $O(CH_2)_2C_6H_5$ |  | 0.79 | 0.78 | 0.75 |
| 95 | S—Ar | S—Ar | H | (3) | $OC_6H_5$ | 0.75 |  | 0.81 |  |
| 96 | S—Ar | S—Ar | H | (3) | $OC_6H_4(2')Cl$ |  | 0.82 |  |  |
| 97 | S—Ar | S—Ar | H | (3) | $OC_6H_4(3')F$ | 0.75 | 0.82 | 0.81 |  |
| 98 | S—Ar | S—Ar | H | (3) | $OC_6H_4(4')CH_3$ |  | 0.82 | 0.81 | 0.79 |
| 99 | S—Ar | S—Ar | H | (3) | $OC_6H_4(4')C_6H_5$ | 0.76 | 0.82 | 0.82 |  |
| 100 | S—Ar | S—Ar | H | (3) | $OC_6H_4(4')COOC_5H_{11}$ | 0.74 | 0.81 |  | 0.78 |
| 101 | S—Ar | S—Ar | H | (3) | $OC_6H_4(4')Cl$ |  | 0.81 | 0.81 | 0.78 |
| 102 | S—Ar | S—Ar | H | (3) | CN |  | 0.76 |  |  |
| 103 | S—Ar | S—Ar | H | (3) | Br |  | 0.76 | 0.76 | 0.73 |
| 104 | S—Ar | S—Ar | H | (6) | 2-Oxazolinyl |  | 0.81 | 0.80 | 0.77 |
| 105 | S—Ar | S—Ar | H | (6) | $CONHC_6H_4(3')F$ |  | 0.81 | 0.81 | 0.78 |
| 106 | S—Ar | S—Ar | H | (6) | $COOC_5H_{11}$ |  | 0.78 |  | 0.75 |
| 107 | S—Ar | S—Ar | H | (6) | $COOC_6H_5$ | 0.76 | 0.82 | 0.82 | 0.80 |
| 108 | S—Ar | S—Ar | H | (6) | $COOC_6H_4(3')CH_3$ | 0.77 | 0.82 |  | 0.80 |
| 109 | S—Ar | S—Ar | H | (6) | $COOC_6H_4(3')COOC_5H_{11}$ | 0.76 | 0.82 | 0.82 |  |
| 110 | S—Ar | S—Ar | H | (6) | CN |  | 0.76 |  |  |
| 111 | S—Ar | $NH_2$ | $NH_2$ | (2) | $CH_3$ |  | 0.76 |  |  |
| 112 | S—Ar | $NH_2$ | $NH_2$ | (2) | 2-Oxazolinyl |  | 0.81 | 0.81 | 0.79 |
| 113 | S—Ar | $NH_2$ | $NH_2$ | (2) | $CONHC_6H_5$ | 0.77 | 0.82 |  | 0.80 |
| 114 | S—Ar | $NH_2$ | $NH_2$ | (2) | $COOC_5H_{11}$ |  | 0.79 | 0.78 | 0.76 |
| 115 | S—Ar | $NH_2$ | $NH_2$ | (2) | $COOC_6H_5$ | 0.79 | 0.82 |  | 0.81 |
| 116 | S—Ar | $NH_2$ | $NH_2$ | (2) | $COOC_6H_4(3')CH_3$ | 0.79 | 0.82 | 0.82 |  |
| 117 | S—Ar | $NH_2$ | $NH_2$ | (2) | $COOC_6H_4(4')COOC_5H_{11}$ | 0.79 | 0.82 | 0.82 |  |
| 118 | S—Ar | $NH_2$ | $NH_2$ | (2) | $O(CH_2)_2C_6H_5$ |  | 0.79 | 0.79 | 0.77 |
| 119 | S—Ar | $NH_2$ | $NH_2$ | (2) | $OC_6H_5$ |  | 0.82 | 0.81 | 0.80 |
| 120 | S—Ar | $NH_2$ | $NH_2$ | (2) | $OC_6H_4(3')F$ |  |  | 0.82 | 0.80 |
| 121 | S—Ar | $NH_2$ | $NH_2$ | (2) | $OC_6H_4(4')CH_3$ | 0.78 | 0.82 |  |  |
| 122 | S—Ar | $NH_2$ | $NH_2$ | (2) | $OC_6H_4(4')COOC_5H_{11}$ | 0.77 | 0.82 | 0.81 |  |
| 123 | S—Ar | $NH_2$ | $NH_2$ | (2) | CN |  |  | 0.77 | 0.75 |
| 124 | S—Ar | $NH_2$ | $NH_2$ | (6) | $CH_3$ | 0.71 | 0.76 | 0.76 | 0.74 |
| 125 | S—Ar | $NH_2$ | $NH_2$ | (6) | $CH_2CH(CH_3)_2$ |  | 0.61 | 0.81 | 0.79 |
| 126 | S—Ar | $NH_2$ | $NH_2$ | (6) | 2-Oxazolinyl | 0.77 | 0.81 | 0.81 | 0.79 |
| 127 | S—Ar | $NH_2$ | $NH_2$ | (6) | $CONHC_6H_5$ | 0.77 | 0.82 |  | 0.80 |
| 128 | S—Ar | $NH_2$ | $NH_2$ | (6) | $COOC_3H_7$ | 0.73 | 0.78 |  | 0.75 |
| 129 | S—Ar | $NH_2$ | $NH_2$ | (6) | $COOC_5H_{11}$ | 0.74 | 0.79 | 0.78 | 0.76 |
| 130 | S—Ar | $NH_2$ | $NH_2$ | (6) | $COOC_6H_5$ | 0.79 |  | 0.82 |  |
| 131 | S—Ar | $NH_2$ | $NH_2$ | (6) | $COOC_6H_4(3')CH_3$ | 0.79 | 0.82 | 0.82 |  |
| 132 | S—Ar | $NH_2$ | $NH_2$ | (6) | $COOC_6H_4(4')CH_3$ | 0.80 | 0.82 | 0.82 | 0.82 |
| 133 | S—Ar | $NH_2$ | $NH_2$ | (6) | $COOC_6H_4(4')OCH_3$ |  | 0.82 | 0.82 | 0.82 |
| 134 | S—Ar | $NH_2$ | $NH_2$ | (6) | $COOC_6H_4(4')COOC_5H_{11}$ | 0.79 | 0.82 | 0.82 |  |
| 135 | S—Ar | $NH_2$ | $NH_2$ | (6) | $COOC_6H_4(4')C_6H_5$ | 0.81 | 0.82 | 0.82 | 0.82 |
| 136 | S—Ar | $NH_2$ | $NH_2$ | (6) | $OC_4H_9$ | 0.73 | 0.78 | 0.77 | 0.75 |
| 137 | S—Ar | $NH_2$ | $NH_2$ | (6) | $OCH_2C_6H_5$ | 0.73 | 0.78 | 0.77 | 0.75 |
| 138 | S—Ar | $NH_2$ | $NH_2$ | (6) | $OC_6H_5$ | 0.78 | 0.82 |  | 0.80 |
| 139 | S—Ar | $NH_2$ | $NH_2$ | (6) | $OC_6H_4(2')OC_2H_5$ |  | 0.82 | 0.82 | 0.80 |
| 140 | S—Ar | $NH_2$ | $NH_2$ | (6) | $OC_6H_4(2')Cl$ |  | 0.82 | 0.82 | 0.80 |
| 141 | S—Ar | $NH_2$ | $NH_2$ | (6) | $OC_6H_4(3')CH_3$ | 0.78 | 0.82 | 0.82 | 0.80 |
| 142 | S—Ar | $NH_2$ | $NH_2$ | (6) | $OC_6H_4(3')Cl$ | 0.79 | 0.82 | 0.82 | 0.81 |
| 143 | S—Ar | $NH_2$ | $NH_2$ | (6) | $OC_6H_4(3')F$ | 0.78 | 0.82 | 0.82 | 0.80 |
| 144 | S—Ar | $NH_2$ | $NH_2$ | (6) | $OC_6H_4(4')CH_3$ | 0.78 |  | 0.82 |  |
| 145 | S—Ar | $NH_2$ | $NH_2$ | (6) | $OC_6H_4(4')C_6H_5$ | 0.79 |  | 0.82 |  |
| 146 | S—Ar | $NH_2$ | $NH_2$ | (6) | $OC_6H_4(4')COOC_2H_5$ |  | 0.82 | 0.82 | 0.80 |
| 147 | S—Ar | $NH_2$ | $NH_2$ | (6) | $OC_6H_4(4')COOC_5H_{11}$ |  | 0.82 | 0.81 | 0.80 |
| 148 | S—Ar | $NH_2$ | $NH_2$ | (6) | $OC_6H_4(4')Cl$ |  | 0.82 | 0.81 | 0.80 |
| 149 | S—Ar | $NH_2$ | $NH_2$ | (6) | O—2-Naphthyl |  | 0.82 | 0.82 | 0.81 |
| 150 | S—Ar | $NH_2$ | $NH_2$ | (6) | CN | 0.72 | 0.77 | 0.77 |  |
| 151 | S—Ar | $NH_2$ | $NH_2$ | (6) | Br | 0.72 | 0.77 | 0.77 |  |
| 152 | $NH_2$ | S—Ar | $NH_2$ | (2) | $CH_2CH(CH_3)_2$ |  | 0.82 |  |  |
| 153 | $NH_2$ | S—Ar | $NH_2$ | (2) | $CONHC_6H_4(3')CH_3$ |  | 0.82 |  | 0.82 |
| 154 | $NH_2$ | S—Ar | $NH_2$ | (2) | $COOC_5H_{11}$ |  | 0.81 | 0.80 | 0.79 |
| 155 | $NH_2$ | S—Ar | $NH_2$ | (2) | $COOC_6H_5$ | 0.81 |  | 0.83 | 0.82 |
| 156 | $NH_2$ | S—Ar | $NH_2$ | (2) | $COOC_6H_4(3')F$ | 0.81 |  | 0.83 | 0.82 |
| 157 | $NH_2$ | S—Ar | $NH_2$ | (2) | $COOC_6H_4(4')CH_3$ | 0.82 | 0.83 | 0.83 |  |
| 158 | $NH_2$ | S—Ar | $NH_2$ | (2) | $OCH_2C_6H_5$ | 0.75 | 0.80 | 0.80 | 0.78 |
| 159 | $NH_2$ | S—Ar | $NH_2$ | (2) | $OC_6H_5$ | 0.80 | 0.82 | 0.82 | 0.82 |
| 160 | $NH_2$ | S—Ar | $NH_2$ | (2) | $OC_6H_4(3')F$ |  | 0.82 |  |  |
| 161 | $NH_2$ | S—Ar | $NH_2$ | (2) | $OC_6H_4(4')C_6H_5$ |  |  | 0.83 | 0.82 |
| 162 | $NH_2$ | S—Ar | $NH_2$ | (2) | $OC_6H_4(4')COOC_5H_{11}$ | 0.80 | 0.82 |  |  |
| 163 | $NH_2$ | S—Ar | $NH_2$ | (2) | CN |  | 0.79 |  |  |
| 164 | $NH_2$ | S—Ar | $NH_2$ | (3) | $CH_3$ |  | 0.79 | 0.78 |  |
| 165 | $NH_2$ | S—Ar | $NH_2$ | (3) | 2-Oxazolinyl |  | 0.82 | 0.82 | 0.81 |
| 166 | $NH_2$ | S—Ar | $NH_2$ | (3) | $CONHC_6H_5$ | 0.80 | 0.82 | 0.82 | 0.82 |
| 167 | $NH_2$ | S—Ar | $NH_2$ | (3) | $COOCH_3$ |  | 0.82 |  |  |
| 168 | $NH_2$ | S—Ar | $NH_2$ | (3) | $COOC_5H_{11}$ |  | 0.81 | 0.80 | 0.79 |

TABLE 2-continued

|  | Y' | Y'' | Y''' | X | Q | $S_1$ | $S_2$ | $S_3$ | $S_4$ |
|---|---|---|---|---|---|---|---|---|---|
| 169 | $NH_2$ | S—Ar | $NH_2$ | (3) | $COOC_6H_4(3')CH_3$ | 0.81 |  | 0.83 | 0.82 |
| 170 | $NH_2$ | S—Ar | $NH_2$ | (3) | $COOC_6H_4(4')Cl$ | 0.81 | 0.83 |  | 0.82 |
| 171 | $NH_2$ | S—Ar | $NH_2$ | (3) | $COOC_6H_4(4')COOC_5H_{11}$ | 0.81 |  | 0.82 | 0.82 |
| 172 | $NH_2$ | S—Ar | $NH_2$ | (3) | $OC_6H_5$ |  | 0.82 | 0.82 | 0.82 |
| 173 | $NH_2$ | S—Ar | $NH_2$ | (3) | $OC_6H_4(2')OC_2H_5$ | 0.80 | 0.82 |  |  |
| 174 | $NH_2$ | S—Ar | $NH_2$ | (3) | $OC_6H_4(2')Cl$ | 0.80 | 0.82 | 0.82 |  |
| 175 | $NH_2$ | S—Ar | $NH_2$ | (3) | $OC_6H_4(3')CH_3$ |  | 0.82 | 0.82 | 0.82 |
| 176 | $NH_2$ | S—Ar | $NH_2$ | (3) | $OC_6H_4(3')Cl$ | 0.81 |  | 0.82 |  |
| 177 | $NH_2$ | S—Ar | $NH_2$ | (3) | $OC_6H_4(3')F$ | 0.80 |  | 0.82 | 0.82 |
| 178 | $NH_2$ | S—Ar | $NH_2$ | (3) | $OC_6H_4(4')CH_3$ | 0.80 | 0.82 |  | 0.82 |
| 179 | $NH_2$ | S—Ar | $NH_2$ | (3) | $OC_6H_4(4')OCH_3$ | 0.81 |  | 0.82 |  |
| 180 | $NH_2$ | S—Ar | $NH_2$ | (3) | $OC_6H_4(4')C_6H_5$ |  | 0.83 |  | 0.82 |
| 181 | $NH_2$ | S—Ar | $NH_2$ | (3) | $OC_6H_4(4')COOC_2H_5$ | 0.80 | 0.82 | 0.82 | 0.82 |
| 182 | $NH_2$ | S—Ar | $NH_2$ | (3) | $OC_6H_4(4')COOC_5H_{11}$ |  | 0.82 |  |  |
| 183 | $NH_2$ | S—Ar | $NH_2$ | (3) | $OC_6H_4(4')Cl$ | 0.80 | 0.82 | 0.82 | 0.82 |
| 184 | $NH_2$ | S—Ar | $NH_2$ | (3) | CN | 0.75 | 0.79 | 0.79 |  |
| 185 | $NH_2$ | S—Ar | $NH_2$ | (3) | Br | 0.75 | 0.79 | 0.79 |  |
| 186 | S—Ar | $NH_2$ | OH | (6) | $CH_3$ |  | 0.74 | 0.73 | 0.71 |
| 187 | S—Ar | $NH_2$ | OH | (6) | $COOC_5H_{11}$ |  | 0.76 |  |  |
| 188 | S—Ar | $NH_2$ | OH | (6) | $COOC_6H_5$ | 0.77 | 0.81 | 0.81 | 0.79 |
| 189 | S—Ar | $NH_2$ | OH | (6) | $COOC_6H_4(4')Cl$ | 0.77 | 0.81 | 0.81 | 0.79 |
| 190 | S—Ar | $NH_2$ | OH | (6) | $COOC_6H_4(4')COOC_5H_{11}$ | 0.77 | 0.81 | 0.81 | 0.79 |
| 191 | S—Ar | $NH_2$ | OH | (6) | $OC_4H_9$ |  |  | 0.75 | 0.73 |
| 192 | S—Ar | $NH_2$ | OH | (6) | $OC_6H_5$ | 0.75 |  | 0.79 |  |
| 193 | S—Ar | $NH_2$ | OH | (6) | $OC_6H_4(3')F$ |  | 0.80 |  | 0.78 |
| 194 | S—Ar | $NH_2$ | OH | (6) | $OC_6H_4(4')CH_3$ |  | 0.80 |  | 0.78 |
| 195 | S—Ar | $NH_2$ | OH | (6) | $OC_6H_4(4')COOC_5H_{11}$ |  | 0.79 |  |  |
| 196 | S—Ar | $NH_2$ | OH | (6) | CN |  | 0.74 | 0.74 |  |
| 197 | S—Ar | $NH_2$ | OH | (2) | $CH_3$ | 0.68 | 0.74 |  |  |
| 198 | S—Ar | $NH_2$ | OH | (3) | 2-Oxazolinyl |  | 0.79 |  |  |
| 199 | S—Ar | $NH_2$ | OH | (3) | $CONHC_6H_5$ | 0.75 | 0.79 | 0.79 | 0.77 |
| 200 | S—Ar | $NH_2$ | OH | (7) | $COOC_5H_{11}$ |  | 0.76 | 0.76 | 0.74 |
| 201 | S—Ar | $NH_2$ | OH | (2) | $COOC_6H_5$ | 0.77 | 0.81 | 0.81 | 0.79 |
| 202 | S—Ar | $NH_2$ | OH | (3) | $COOC_6H_4(3')CH_3$ | 0.77 | 0.81 | 0.81 |  |
| 203 | S—Ar | $NH_2$ | OH | (7) | $COOC_6H_4(4')Cl$ |  | 0.81 | 0.81 | 0.79 |
| 204 | S—Ar | $NH_2$ | OH | (2) | $COOC_6H_4(4')COOC_5H_{11}$ |  |  | 0.81 | 0.79 |
| 205 | S—Ar | $NH_2$ | OH | (7) | $COOC_6H_4(4')C_6H_5$ | 0.79 | 0.82 |  |  |
| 206 | S—Ar | $NH_2$ | OH | (3) | $OC_4H_9$ |  | 0.75 | 0.75 | 0.73 |
| 207 | S—Ar | $NH_2$ | OH | (7) | $O(CH_2)_2C_6H_5$ | 0.72 |  | 0.76 | 0.74 |
| 208 | S—Ar | $NH_2$ | OH | (2) | $OC_6H_5$ | 0.75 |  | 0.79 | 0.77 |
| 209 | S—Ar | $NH_2$ | OH | (3) | $OC_6H_4(3')CH_3$ | 0.75 | 0.80 | 0.79 |  |
| 210 | S—Ar | $NH_2$ | OH | (2) | $OC_6H_4(3')F$ |  | 0.80 | 0.80 | 0.78 |
| 211 | S—Ar | $NH_2$ | OH | (7) | $OC_6H_4(4')C_6H_5$ | 0.77 | 0.81 |  |  |
| 212 | S—Ar | $NH_2$ | OH | (2) | $OC_6H_4(4')COOC_5H_{11}$ |  | 0.79 |  |  |
| 213 | S—Ar | $NH_2$ | OH | (2) | CN |  |  | 0.74 | 0.72 |
| 214 | $NH_2$ | S—Ar | OH | (3) | $CH_3$ |  | 0.76 | 0.76 | 0.74 |
| 215 | $NH_2$ | S—Ar | OH | (3) | 2-Oxazolinyl |  | 0.81 | 0.81 |  |
| 216 | $NH_2$ | S—Ar | OH | (3) | $CONHC_6H_5$ | 0.77 | 0.81 |  |  |
| 217 | $NH_2$ | S—Ar | OH | (3) | $COOC_6H_4(4')COOC_5H_{11}$ |  | 0.82 |  | 0.81 |
| 218 | $NH_2$ | S—Ar | OH | (3) | $OC_6H_4(4')C_6H_5$ |  | 0.82 |  |  |
| 219 | $NH_2$ | S—Ar | OH | (3) | $OC_6H_4(3')COOC_5H_{11}$ |  | 0.81 | 0.81 | 0.79 |
| 220 | $NH_2$ | S—Ar | OH | (3) | CN |  | 0.77 |  |  |
| 221 | $NH_2$ | S—Ar | OH | (3) | Br |  |  | 0.76 |  |
| 222 | $NH_2$ | S—Ar | OH | (7) | $CH_2CH(CH_3)_2$ |  | 0.81 |  |  |
| 223 | $NH_2$ | S—Ar | OH | (7) | $CONHC_6H_5$ |  |  | 0.81 |  |
| 224 | $NH_2$ | S—Ar | OH | (7) | $COOC_5H_{11}$ |  | 0.79 | 0.78 |  |
| 225 | $NH_2$ | S—Ar | OH | (7) | $COOC_6H_5$ |  | 0.82 | 0.82 |  |
| 226 | $NH_2$ | S—Ar | OH | (7) | $COOC_6H_4(4')C_6H_5$ | 0.81 | 0.82 | 0.82 | 0.82 |
| 227 | $NH_2$ | S—Ar | OH | (7) | $OC_4H_9$ |  | 0.78 | 0.77 | 0.75 |
| 228 | $NH_2$ | S—Ar | OH | (7) | $OC_6H_5$ | 0.77 | 0.82 |  | 0.80 |
| 229 | $NH_2$ | S—Ar | OH | (7) | $OC_6H_4(3')F$ | 0.78 |  | 0.82 | 0.80 |
| 230 | $NH_2$ | S—Ar | OH | (7) | $OC_6H_4(4')SCH_3$ |  | 0.82 | 0.81 |  |
| 231 | $NH_2$ | S—Ar | OH | (7) | $OC_6H_4(4')COOC_5H_{11}$ |  | 0.81 | 0.81 | 0.79 |
| 232 | $NH_2$ | S—Ar | OH | (7) | CN |  | 0.77 | 0.76 | 0.74 |
| 233 | $NH_2$ | S—Ar | Cl | (3) | $CH_3$ |  | 0.75 |  |  |
| 234 | $NH_2$ | S—Ar | Cl | (3) | $COOC_5H_{11}$ |  | 0.78 | 0.77 |  |
| 235 | $NH_2$ | S—Ar | Cl | (3) | $COOC_6H_5$ | 0.78 | 0.82 | 0.82 | 0.80 |
| 236 | $NH_2$ | S—Ar | Cl | (2) | $COOC_6H_4(4')CH_3$ |  | 0.82 |  |  |
| 237 | $NH_2$ | S—Ar | Cl | (3) | $OC_6H_5$ | 0.77 | 0.81 | 0.81 |  |
| 238 | $NH_2$ | S—Ar | Cl | (2) | $OC_6H_4(4')C_6H_5$ |  |  | 0.82 |  |
| 239 | $NH_2$ | S—Ar | Cl | (3) | CN | 0.71 | 0.76 |  |  |
| 240 | S—Ar | $NH_2$ | H | (6) | $CH_3$ |  | 0.75 | 0.75 | 0.73 |
| 241 | S—Ar | $NH_2$ | H | (6) | 2-Oxazolinyl | 0.76 | 0.80 | 0.80 | 0.78 |
| 242 | S—Ar | $NH_2$ | H | (6) | $CONHC_6H_5$ | 0.76 | 0.81 | 0.80 | 0.79 |
| 243 | S—Ar | $NH_2$ | H | (6) | $COOCH_3$ |  | 0.79 |  |  |
| 244 | S—Ar | $NH_2$ | H | (6) | $COOC_3H_7$ |  | 0.77 | 0.76 |  |
| 245 | S—Ar | $NH_2$ | H | (6) | $COOC_5H_{11}$ | 0.73 | 0.78 | 0.77 |  |
| 246 | S—Ar | $NH_2$ | H | (6) | $COOC_6H_5$ |  | 0.82 | 0.82 | 0.80 |
| 247 | S—Ar | $NH_2$ | H | (6) | $COOC_6H_4(3')CH_3$ | 0.79 |  | 0.82 | 0.81 |
| 248 | S—Ar | $NH_2$ | H | (6) | $COOC_6H_4(4')CH_3$ |  |  | 0.82 | 0.81 |
| 249 | S—Ar | $NH_2$ | H | (6) | $COOC_6H_4(4')Cl$ | 0.78 | 0.82 | 0.82 |  |

TABLE 2-continued

| | Y' | Y'' | Y''' | X | Q | $S_1$ | $S_2$ | $S_3$ | $S_4$ |
|---|---|---|---|---|---|---|---|---|---|
| 250 | S—Ar | NH$_2$ | H | (6) | COOC$_6$H$_4$(4')COOC$_5$H$_{11}$ | | 0.82 | 0.82 | 0.80 |
| 251 | S—Ar | NH$_2$ | H | (6) | COOC$_6$H$_4$(4')C$_6$H$_5$ | 0.80 | 0.82 | 0.82 | |
| 252 | S—Ar | NH$_2$ | H | (6) | CN | | 0.76 | 0.76 | |
| 253 | S—Ar | NH$_2$ | H | (6) | Br | | 0.76 | | |
| 254 | S—Ar | NH$_2$ | H | (2) | CH$_3$ | | 0.75 | 0.75 | 0.73 |
| 255 | S—Ar | NH$_2$ | H | (2) | 2-Oxazolinyl | | 0.80 | 0.80 | |
| 256 | S—Ar | NH$_2$ | H | (2) | CONHC$_6$H$_5$ | 0.76 | 0.81 | | |
| 257 | S—Ar | NH$_2$ | H | (2) | COOC$_5$H$_{11}$ | | 0.78 | | 0.75 |
| 258 | S—Ar | NH$_2$ | H | (2) | COOC$_6$H$_5$ | | | 0.82 | 0.80 |
| 259 | S—Ar | NH$_2$ | H | (2) | COOC$_6$H$_4$(3')CH$_3$ | 0.79 | 0.82 | | 0.81 |
| 260 | S—Ar | NH$_2$ | H | (2) | COOC$_6$H$_4$(4')CH$_3$ | | 0.82 | 0.82 | 0.81 |
| 261 | S—Ar | NH$_2$ | H | (2) | COOC$_6$H$_4$(4')COOC$_5$H$_{11}$ | | 0.82 | 0.82 | |
| 262 | S—Ar | NH$_3$ | H | (2) | COOC$_6$H$_4$(4')C$_6$H$_5$ | | | 0.82 | |
| 263 | S—Ar | NH$_2$ | H | (2) | OC$_6$H$_5$ | 0.77 | 0.81 | 0.81 | 0.79 |
| 264 | S—Ar | NH$_2$ | H | (2) | OC$_6$H$_4$(4')COOC$_5$H$_{11}$ | 0.76 | 0.81 | | 0.79 |
| 265 | S—Ar | NH$_2$ | H | (2) | CN | | 0.76 | 0.76 | |
| 266 | S—Ar | NH$_2$ | H | (3) | CH$_2$CH(CH$_3$)$_2$ | | 0.80 | | |
| 267 | S—Ar | NH$_2$ | H | (3) | 2-Oxazolinyl | 0.76 | 0.80 | | 0.78 |
| 268 | S—Ar | NH$_2$ | H | (3) | CONHC$_6$H$_5$ | | 0.81 | | 0.79 |
| 269 | S—Ar | NH$_2$ | H | (3) | COOC$_5$H$_{11}$ | | 0.78 | | |
| 270 | S—Ar | NH$_2$ | H | (3) | COOC$_6$H$_5$ | | 0.82 | | 0.80 |
| 271 | S—Ar | NH$_2$ | H | (3) | COOC$_6$H$_4$(4')CH$_3$ | 0.79 | 0.82 | 0.82 | 0.81 |
| 272 | S—Ar | NH$_2$ | H | (3) | COOC$_6$H$_4$(4')C$_6$H$_5$ | | 0.82 | | |
| 273 | S—Ar | NH$_2$ | H | (3) | OC$_4$H$_9$ | 0.72 | 0.77 | | |
| 274 | S—Ar | NH$_2$ | H | (3) | OC$_6$H$_5$ | 0.77 | 0.81 | 0.81 | 0.79 |
| 275 | S—Ar | NH$_2$ | H | (3) | OC$_6$H$_4$(4')COOC$_2$H$_5$ | | 0.81 | | 0.79 |
| 276 | S—Ar | NH$_2$ | H | (3) | OC$_6$H$_4$(4')COOC$_5$H$_{11}$ | | 0.81 | 0.80 | |
| 277 | S—Ar | NH$_2$ | H | (3) | O—2-Naphthyl | | 0.82 | | |
| 278 | S—Ar | NH$_2$ | H | (3) | CN | | 0.76 | 0.76 | 0.74 |
| 279 | NH$_2$ | H | S—Ar | (3) | CH$_3$ | | 0.72 | | |
| 280 | NH$_2$ | H | S—Ar | (3) | 2-Oxazolinyl | | 0.77 | 0.77 | 0.75 |
| 281 | NH$_2$ | H | S—Ar | (3) | CONHC$_6$H$_5$ | | 0.78 | 0.78 | 0.76 |
| 282 | NH$_2$ | H | S—Ar | (3) | COOCH$_3$ | | 0.76 | 0.75 | |
| 283 | NH$_2$ | H | S—Ar | (3) | COOC$_5$H$_{11}$ | | 0.75 | 0.74 | 0.72 |
| 284 | NH$_2$ | H | S—Ar | (3) | COOC$_6$H$_5$ | | 0.80 | | 0.78 |
| 285 | NH$_2$ | H | S—Ar | (3) | COOC$_6$H$_4$(3')CH$_3$ | 0.75 | 0.80 | 0.80 | |
| 286 | NH$_2$ | H | S—Ar | (3) | COOC$_6$H$_4$(4')CH$_3$ | | 0.80 | | 0.78 |
| 287 | NH$_2$ | H | S—Ar | (3) | COOC$_6$H$_4$(4')Cl | | 0.80 | 0.79 | |
| 288 | NH$_2$ | H | S—Ar | (3) | COOC$_6$H$_4$(4')COOC$_5$H$_{11}$ | 0.75 | | | 0.77 |
| 289 | NH$_2$ | H | S—Ar | (3) | COOC$_6$H$_4$(4')C$_6$H$_5$ | 0.77 | 0.81 | | 0.79 |
| 290 | NH$_2$ | H | S—Ar | (3) | OCH$_2$C$_6$H$_5$ | | 0.74 | | |
| 291 | NH$_2$ | H | S—Ar | (3) | OC$_6$H$_5$ | | 0.78 | 0.78 | 0.76 |
| 292 | NH$_2$ | H | S—Ar | (3) | OC$_6$H$_4$(2')Cl | | 0.79 | 0.78 | |
| 293 | NH$_2$ | H | S—Ar | (3) | OC$_6$H$_4$(3')CH$_3$ | 0.74 | 0.78 | | 0.76 |
| 294 | NH$_2$ | H | S—Ar | (3) | OC$_6$H$_4$(3')F | 0.74 | 0.79 | 0.78 | |
| 295 | NH$_2$ | H | S—Ar | (3) | OC$_6$H$_4$(4')CH$_3$ | 0.74 | 0.79 | | 0.76 |
| 296 | NH$_2$ | H | S—Ar | (3) | OC$_6$H$_4$(4')C$_6$H$_5$ | | | 0.79 | |
| 297 | NH$_2$ | H | S—Ar | (3) | OC$_6$H$_4$(4')COOC$_5$H$_{11}$ | | 0.78 | | 0.76 |
| 298 | NH$_2$ | H | S—Ar | (3) | CN | | 0.73 | | 0.70 |
| 299 | NH$_2$ | H | S—Ar | (3) | Cl | | 0.72 | | |
| 300 | NH$_2$ | H | S—Ar | (2) | 2-Oxazolinyl | | 0.77 | 0.77 | 0.75 |
| 301 | NH$_2$ | H | S—Ar | (2) | CONHC$_6$H$_5$ | | 0.78 | | |
| 302 | NH$_2$ | H | S—Ar | (2) | COOC$_5$H$_{11}$ | | 0.75 | | |
| 303 | NH$_2$ | H | S—Ar | (2) | COOC$_6$H$_5$ | | 0.80 | 0.79 | 0.78 |
| 304 | NH$_2$ | H | S—Ar | (2) | COOC$_6$H$_4$(3')CH$_3$ | | | 0.80 | |
| 305 | NH$_2$ | H | S—Ar | (2) | O(CH$_2$)$_2$C$_6$H$_5$ | | 0.75 | | |
| 306 | NH$_2$ | H | S—Ar | (2) | OC$_6$H$_5$ | 0.73 | 0.78 | 0.78 | 0.76 |
| 307 | NH$_2$ | H | S—Ar | (2) | OC$_6$H$_4$(4')C$_6$H$_5$ | | 0.80 | 0.79 | |
| 308 | NH$_2$ | H | S—Ar | (2) | OC$_6$H$_4$(4')COOC$_5$H$_{11}$ | | 0.78 | 0.78 | |
| 309 | NH$_2$ | H | S—Ar | (2) | CN | | 0.73 | 0.72 | |
| 310 | NH$_2$ | H | S—Ar | (7) | CH$_3$ | 0.66 | 0.72 | 0.71 | 0.69 |
| 311 | NH$_2$ | H | S—Ar | (7) | 2-Oxazolinyl | | 0.77 | 0.77 | 0.75 |
| 312 | NH$_2$ | H | S—Ar | (7) | CONHC$_6$H$_4$(4')CH$_3$ | 0.73 | 0.78 | 0.78 | 0.76 |
| 313 | NH$_2$ | H | S—Ar | (7) | COOCH$_3$ | | 0.76 | | 0.73 |
| 314 | NH$_2$ | H | S—Ar | (7) | COOC$_5$H$_{11}$ | | 0.75 | 0.74 | |
| 315 | NH$_2$ | H | S—Ar | (7) | COOC$_6$H$_5$ | 0.75 | 0.80 | 0.79 | 0.78 |
| 316 | NH$_2$ | H | S—Ar | (7) | COOC$_6$H$_4$(3')CH$_3$ | 0.75 | 0.80 | | 0.78 |
| 317 | NH$_2$ | H | S—Ar | (7) | COOC$_6$H$_4$(4')CH$_3$ | 0.76 | | 0.80 | 0.78 |
| 318 | NH$_2$ | H | S—Ar | (7) | COOC$_6$H$_4$(4')COOC$_5$H$_{11}$ | | 0.80 | 0.79 | |
| 319 | NH$_2$ | H | S—Ar | (7) | COOC$_6$H$_4$(4')C$_6$H$_5$ | 0.77 | 0.81 | | 0.79 |
| 320 | NH$_2$ | H | S—Ar | (7) | CN | | 0.73 | 0.72 | 0.70 |
| 321 | NH$_2$ | S—Ar | H | (3) | CH$_3$ | 0.73 | 0.78 | 0.77 | |
| 322 | NH$_2$ | S—Ar | H | (3) | CH$_2$CH(CH$_3$)$_2$ | | 0.82 | 0.82 | |
| 323 | NH$_2$ | S—Ar | H | (3) | 2-Oxazolinyl | | 0.82 | 0.82 | 0.80 |
| 324 | NH$_2$ | S—Ar | H | (3) | CONHC$_6$H$_5$ | 0.79 | 0.82 | | 0.81 |
| 325 | NH$_2$ | S—Ar | H | (3) | COOC$_3$H$_7$ | | 0.79 | 0.79 | |
| 326 | NH$_2$ | S—Ar | H | (3) | COOC$_5$H$_{11}$ | 0.75 | 0.80 | 0.80 | |
| 327 | NH$_2$ | S—Ar | H | (3) | COOC$_6$H$_5$ | 0.80 | 0.82 | | 0.82 |
| 328 | NH$_2$ | S—Ar | H | (3) | COOC$_6$H$_4$(3')CH$_3$ | | | 0.82 | 0.82 |
| 329 | NH$_2$ | S—Ar | H | (3) | COOC$_6$H$_4$(4')CH$_3$ | 0.81 | 0.83 | 0.82 | 0.82 |
| 330 | NH$_2$ | S—Ar | H | (3) | COOC$_6$H$_4$(4')OCH$_3$ | | 0.83 | | |

TABLE 2-continued

| | Y' | Y'' | Y''' | X | Q | $S_1$ | $S_2$ | $S_3$ | $S_4$ |
|---|---|---|---|---|---|---|---|---|---|
| 331 | NH$_2$ | S—Ar | H | (3) | COOC$_6$H$_4$(4')Cl | | 0.82 | | 0.82 |
| 332 | NH$_2$ | S—Ar | H | (3) | COOC$_6$H$_4$(4')COOC$_5$H$_{11}$ | 0.80 | 0.82 | 0.82 | 0.82 |
| 333 | NH$_2$ | S—Ar | H | (3) | COOC$_6$H$_4$(4')C$_6$H$_5$ | | | 0.83 | |
| 334 | NH$_2$ | S—Ar | H | (3) | OC$_4$H$_9$ | | 0.79 | | 0.77 |
| 335 | NH$_2$ | S—Ar | H | (3) | O(CH$_2$)$_2$C$_6$H$_5$ | 0.76 | | 0.80 | |
| 336 | NH$_2$ | S—Ar | H | (3) | OC$_6$H$_5$ | 0.79 | 0.82 | 0.82 | 0.81 |
| 337 | NH$_2$ | S—Ar | H | (3) | OC$_6$H$_4$(2')Cl | | 0.82 | | |
| 338 | NH$_2$ | S—Ar | H | (3) | OC$_6$H$_4$(3')CH$_3$ | | 0.82 | 0.82 | |
| 339 | NH$_2$ | S—Ar | H | (3) | OC$_6$H$_4$(3')F | 0.79 | 0.82 | | 0.81 |
| 340 | NH$_2$ | S—Ar | H | (3) | OC$_6$H$_4$(4')CH$_3$ | 0.79 | 0.82 | 0.82 | |
| 341 | NH$_2$ | S—Ar | H | (3) | OC$_6$H$_4$(4')C$_6$H$_5$ | | 0.82 | 0.82 | 0.82 |
| 342 | NH$_2$ | S—Ar | H | (3) | OC$_6$H$_4$(4')COOC$_2$H$_5$ | | | 0.82 | 0.81 |
| 343 | NH$_2$ | S—Ar | H | (3) | OC$_6$H$_4$(4')COOC$_5$H$_{11}$ | 0.79 | 0.82 | 0.82 | 0.81 |
| 344 | NH$_2$ | S—Ar | H | (3) | O—2-Naphthyl | | 0.82 | | 0.82 |
| 345 | NH$_2$ | S—Ar | H | (3) | NO$_2$ | | 0.78 | | |
| 346 | NH$_2$ | S—Ar | H | (3) | Br | | | 0.78 | |
| 347 | NH$_2$ | S—AR | H | (2) | CH$_3$ | | 0.78 | | |
| 348 | NH$_2$ | S—Ar | H | (2) | 2-Oxazolinyl | | 0.82 | | 0.80 |
| 349 | NH$_2$ | S—Ar | H | (2) | CONHC$_6$H$_4$(4')C$_6$H$_5$ | 0.79 | 0.82 | | |
| 350 | NH$_2$ | S—Ar | H | (2) | COOC$_5$H$_{11}$ | | 0.80 | 0.80 | 0.78 |
| 351 | NH$_2$ | S—Ar | H | (2) | COOC$_6$H$_5$ | 0.80 | 0.82 | 0.82 | |
| 352 | NH$_2$ | S—Ar | H | (2) | O(CH$_2$)$_2$C$_6$H$_5$ | | 0.80 | 0.80 | 0.78 |
| 353 | NH$_2$ | S—Ar | H | (2) | OC$_6$H$_5$ | 0.79 | 0.82 | | 0.81 |
| 354 | NH$_2$ | S—Ar | H | (2) | OC$_6$H$_4$(4')COOC$_5$H$_{11}$ | | 0.82 | | |
| 355 | NH$_2$ | S—Ar | H | (2) | CN | | | 0.78 | |
| 356 | NH$_2$ | S—Ar | H | (6) | CH$_3$ | | 0.78 | | 0.75 |
| 357 | NH$_2$ | S—Ar | H | (6) | 2-Oxazolinyl | | 0.82 | 0.82 | |
| 358 | NH$_2$ | S—Ar | H | (6) | CONHC$_6$H$_4$(3')Cl | | 0.82 | 0.82 | |
| 359 | NH$_2$ | S—Ar | H | (6) | COOC$_5$H$_{11}$ | 0.75 | 0.80 | 0.80 | |
| 360 | NH$_2$ | S—Ar | H | (6) | COOC$_6$H$_5$ | | 0.82 | 0.82 | 0.82 |
| 361 | NH$_2$ | S—Ar | H | (6) | COOC$_6$H$_4$(4')COOC$_5$H$_{11}$ | 0.80 | 0.82 | | 0.82 |
| 362 | NH$_2$ | S—Ar | H | (6) | CN | | | 0.78 | |
| 363 | NH$_2$ | S—Ar | H | (6) | Cl | 0.73 | | | |
| 364 | OH | S—Ar | OH | (3) | CH$_3$ | | 0.73 | 0.73 | |
| 365 | OH | S—Ar | OH | (3) | CH$_2$CH(CH$_3$)$_2$ | 0.74 | | 0.79 | 0.77 |
| 366 | OH | S—Ar | OH | (3) | 2-Oxazolinyl | 0.74 | | 0.78 | |
| 367 | OH | S—Ar | OH | (3) | CONHC$_6$H$_5$ | | 0.79 | | |
| 368 | OH | S—Ar | OH | (3) | COOC$_5$H$_{11}$ | | 0.76 | 0.76 | |
| 369 | OH | S—Ar | OH | (3) | COOC$_6$H$_5$ | 0.77 | 0.81 | | 0.79 |
| 370 | OH | S—Ar | OH | (3) | COOC$_6$H$_4$(3')CH$_3$ | 0.77 | | 0.81 | |
| 371 | OH | S—Ar | OH | (3) | COOC$_6$H$_4$(4')C$_6$H$_5$ | | 0.82 | 0.82 | |
| 372 | OH | S—Ar | OH | (3) | OCH$_2$C$_6$H$_5$ | | 0.75 | | |
| 373 | OH | S—Ar | OH | (3) | OC$_6$H$_5$ | 0.75 | 0.79 | 0.79 | 0.77 |
| 374 | OH | S—Ar | OH | (3) | OC$_6$H$_4$(3')Cl | | | | 0.78 |
| 375 | OH | S—Ar | OH | (3) | OC$_6$H(4')C$_6$H$_5$ | | | 0.81 | 0.79 |
| 376 | OH | S—Ar | OH | (3) | OC$_6$H$_4$(4')COOC$_5$H$_{11}$ | | 0.79 | 0.79 | 0.77 |
| 377 | OH | S—Ar | OH | (3) | CN | | 0.74 | | |
| 378 | OH | S—Ar | OH | (3) | Cl | | | | 0.71 |
| 379 | OH | S—Ar | H | (3) | CH$_3$ | 0.70 | 0.75 | | 0.72 |
| 380 | OH | S—Ar | H | (3) | COOC$_5$H$_{11}$ | 0.73 | 0.78 | | |
| 381 | OH | S—Ar | H | (3) | COOC$_6$H$_5$ | | 0.82 | 0.82 | |
| 382 | OH | S—Ar | H | (3) | COOC$_6$H$_4$(4')C$_6$H$_5$ | | 0.82 | | |
| 383 | OH | S—Ar | H | (3) | OC$_6$H$_5$ | 0.76 | 0.81 | 0.80 | 0.79 |
| 384 | OH | S—Ar | H | (3) | OC$_6$H$_4$(4')COOC$_5$H$_{11}$ | | | 0.80 | |
| 385 | OH | S—Ar | H | (3) | CN | | 0.76 | 0.75 | |
| 386 | OH | S—Ar | H | (2) | CH$_2$CH(CH$_3$)$_2$ | | 0.80 | | |
| 387 | OH | S—Ar | H | (2) | 2-Oxazolinyl | | 0.80 | 0.80 | |
| 388 | OH | S—Ar | H | (2) | COOC$_3$H$_7$ | | | 0.76 | 0.74 |
| 389 | OH | S—Ar | H | (2) | COOC$_6$H$_4$(4')COOC$_5$H$_{11}$ | 0.78 | 0.82 | 0.82 | |
| 390 | OH | S—Ar | H | (2) | OC$_4$H$_9$ | | 0.77 | 0.76 | |
| 391 | OH | S—Ar | H | (2) | OC$_6$H$_4$(3')F | | 0.81 | 0.81 | |
| 392 | OH | S—Ar | H | (2) | O—2-Naphthyl | | 0.82 | | |
| 393 | OH | S—Ar | H | (2) | CN | | 0.75 | | |
| 394 | OH | S—Ar | H | (6) | CH$_3$ | | 0.75 | | |
| 395 | OH | S—Ar | H | (6) | 2-Oxazolinyl | | 0.80 | 0.80 | 0.78 |
| 396 | OH | S—Ar | H | (6) | CONHC$_6$H$_4$(3')F | 0.76 | 0.81 | | 0.79 |
| 397 | OH | S—Ar | H | (6) | COOCH$_3$ | | 0.79 | 0.78 | |
| 398 | OH | S—Ar | H | (6) | COOC$_6$H$_4$(3')F | | 0.82 | 0.82 | 0.80 |
| 399 | OH | S—Ar | H | (6) | COOC$_6$H$_4$(4')C$_6$H$_5$ | 0.80 | | | 0.82 |
| 400 | Cl | S—Ar | H | (2) | CH$_3$ | | 0.74 | 0.74 | |
| 401 | Cl | S—Ar | H | (6) | COOC$_6$H$_5$ | | | 0.81 | 0.80 |
| 402 | S—Ar | H | H | (2) | CH$_3$ | | 0.74 | 0.74 | 0.71 |
| 403 | S—Ar | H | H | (2) | CH$_2$CH(CH$_3$)$_2$ | 0.75 | 0.80 | 0.79 | |
| 404 | S—Ar | H | H | (2) | 2-Oxazolinyl | 0.75 | 0.79 | 0.79 | |
| 405 | S—Ar | H | H | (2) | CONHC$_6$H$_5$ | 0.75 | 0.80 | | 0.78 |
| 406 | S—Ar | H | H | (2) | COOC$_3$H$_7$ | | 0.76 | 0.75 | 0.73 |
| 407 | S—Ar | H | H | (2) | COOC$_5$H$_{11}$ | | 0.77 | 0.76 | |
| 408 | S—Ar | H | H | (2) | COOC$_6$H$_5$ | | 0.82 | 0.81 | 0.80 |
| 409 | S—Ar | H | H | (2) | COOC$_6$H$_4$(3')CH$_3$ | | 0.82 | 0.81 | 0.80 |
| 410 | S—Ar | H | H | (2) | COOC$_6$H$_4$(4')CH$_3$ | | 0.82 | 0.82 | 0.80 |
| 411 | S—Ar | H | H | (2) | COOC$_6$H$_4$(4')Cl | 0.77 | 0.81 | 0.81 | |

TABLE 2-continued

|  | Y' | Y'' | Y''' | X | Q | $S_1$ | $S_2$ | $S_3$ | $S_4$ |
|---|---|---|---|---|---|---|---|---|---|
| 412 | S—Ar | H | H | (2) | $COOC_6H_4(4')COOC_5H_{11}$ |  | 0.81 | 0.81 |  |
| 413 | S—Ar | H | H | (2) | $OC_4H_9$ | 0.71 | 0.76 |  | 0.73 |
| 414 | S—Ar | H | H | (2) | $O(CH_2)_2C_6H_5$ | 0.72 |  | 0.77 |  |
| 415 | S—Ar | H | H | (2) | $OC_6H_5$ | 0.76 |  | 0.80 |  |
| 416 | S—Ar | H | H | (2) | $OC_6H_5(2')Cl$ |  | 0.81 | 0.80 | 0.79 |
| 417 | S—Ar | H | H | (2) | $OC_6H_4(3')CH_3$ | 0.76 | 0.80 | 0.80 |  |
| 418 | S—Ar | H | H | (2) | $OC_6H_4(3')F$ |  | 0.81 | 0.80 | 0.79 |
| 419 | S—Ar | H | H | (2) | $OC_6H_4(4')OCH_3$ | 0.77 | 0.81 | 0.81 | 0.79 |
| 420 | S—Ar | H | H | (2) | $OC_6H_4(4')C_6H_5$ | 0.77 | 0.82 | 0.81 | 0.80 |
| 421 | S—Ar | H | H | (2) | $OC_6H_4(4')COOC_2H_5$ | 0.76 | 0.80 |  | 0.78 |
| 422 | S—Ar | H | H | (2) | $OC_6H_4(4')COOC_5H_{11}$ | 0.75 |  | 0.80 | 0.78 |
| 423 | S—Ar | H | H | (2) | O—2-Naphthyl |  | 0.81 | 0.81 | 0.79 |
| 424 | S—Ar | H | H | (2) | CN | 0.70 | 0.75 | 0.75 | 0.72 |
| 425 | S—Ar | H | H | (2) | Cl |  |  | 0.74 |  |
| 426 | H | H | S—Ar | (2) | $CH_3$ |  |  | 0.63 | 0.60 |
| 427 | H | H | S—Ar | (2) | $CH_2CH(CH_3)_2$ |  | 0.70 | 0.70 |  |
| 428 | H | H | S—Ar | (2) | 2-Oxazolinyl |  | 0.70 |  |  |
| 429 | H | H | S—Ar | (2) | $CONHC_6H_5$ | 0.65 | 0.71 | 0.70 |  |
| 430 | H | H | S—Ar | (2) | $COOC_3H_7$ |  | 0.65 | 0.64 |  |
| 431 | H | H | S—Ar | (2) | $COOC_6H_5$ |  | 0.73 | 0.73 | 0.70 |
| 432 | H | H | S—Ar | (2) | $COOC_6H_4(4')OCH_3$ | 0.69 | 0.74 |  | 0.71 |
| 433 | H | H | S—Ar | (2) | $COOC_6H_4(4')COOC_5H_{11}$ |  | 0.73 | 0.72 |  |
| 434 | H | H | S—Ar | (2) | CN |  | 0.64 |  |  |
| 435 | H | S—Ar | H | (2) | $CH_3$ |  | 0.77 | 0.76 | 0.74 |
| 436 | H | S—Ar | H | (2) | $CH_2CH(CH_3)_2$ | 0.77 | 0.82 |  | 0.80 |
| 437 | H | S—Ar | H | (2) | 2-Oxazolinyl |  | 0.81 | 0.81 | 0.79 |
| 438 | H | S—Ar | H | (2) | $CONHC_6H_5$ |  | 0.82 | 0.82 |  |
| 439 | H | S—Ar | H | (2) | $COOC_3H_7$ |  | 0.78 | 0.78 |  |
| 440 | H | S—Ar | H | (2) | $COOC_5H_{11}$ | 0.74 |  | 0.79 |  |
| 441 | H | S—Ar | H | (2) | $COOC_6H_5$ |  |  | 0.82 | 0.82 |
| 442 | H | S—Ar | H | (2) | $COOC_6H_4(3')CH_3$ |  | 0.82 | 0.82 | 0.82 |
| 443 | H | S—Ar | H | (2) | $COOC_6H_4(4')OCH_3$ | 0.80 |  | 0.82 | 0.82 |
| 444 | H | S—Ar | H | (2) | $COOC_6H_4(4')COOC_5H_{11}$ | 0.79 | 0.82 |  | 0.81 |
| 445 | H | S—Ar | H | (2) | CN |  | 0.77 | 0.77 | 0.75 |
| 446 | H | S—Ar | H | (2) | Cl |  | 0.77 |  |  |
| 447 | $NH_2$ | $NH_2$ | $NH_2$ | (2) | $CH_3$ |  | 0.72 |  |  |
| 448 | $NH_2$ | $NH_2$ | $NH_2$ | (3) | 2-Oxazolinyl |  | 0.78 | 0.78 | 0.77 |
| 449 | $NH_2$ | $NH_2$ | $NH_2$ | (3) | $CONHC_6H_5$ |  | 0.79 | 0.78 |  |
| 450 | $NH_2$ | $NH_2$ | $NH_2$ | (7) | $COOC_3H_7$ |  | 0.74 | 0.74 | 0.73 |
| 451 | $NH_2$ | $NH_2$ | $NH_2$ | (6) | $COOC_5H_{11}$ | 0.73 |  | 0.75 | 0.74 |
| 452 | $NH_2$ | $NH_2$ | $NH_2$ | (6) | $COOC_6H_5$ | 0.78 | 0.80 |  |  |
| 453 | $NH_2$ | $NH_2$ | $NH_2$ | (7) | $COOC_6H_4(3')CH_3$ |  | 0.80 |  | 0.79 |
| 454 | $NH_2$ | $NH_2$ | $NH_2$ | (2) | $COOC_6H_4(4')COOC_5H_{11}$ |  | 0.80 |  |  |
| 455 | $NH_2$ | $NH_2$ | $NH_2$ | (3) | $COOC_6H_4(4')C_6H_5$ |  | 0.82 | 0.82 | 0.81 |
| 456 | $NH_2$ | $NH_2$ | $NH_2$ | (3) | $OC_6H_5$ |  | 0.79 | 0.79 | 0.78 |
| 457 | $NH_2$ | $NH_2$ | $NH_2$ | (6) | $OC_6H_4(3')F$ |  | 0.79 |  | 0.78 |
| 458 | $NH_2$ | $NH_2$ | $NH_2$ | (7) | $OC_6H_4(4')CH_3$ |  | 0.79 | 0.79 | 0.78 |
| 459 | $NH_2$ | $NH_2$ | H | (2) | $CH_3$ |  | 0.71 | 0.71 | 0.70 |
| 460 | $NH_2$ | $NH_2$ | H | (2) | $COOC_5H_{11}$ |  | 0.74 |  | 0.73 |
| 461 | $NH_2$ | $NH_2$ | H | (2) | $COOC_6H_5$ | 0.77 | 0.79 | 0.79 |  |
| 462 | $NH_2$ | $NH_2$ | H | (2) | $COOC_6H_4(4')C_6H_5$ |  | 0.81 |  | 0.80 |
| 463 | $NH_2$ | $NH_2$ | H | (2) | $OC_6H_5$ | 0.75 | 0.78 | 0.78 | 0.77 |
| 464 | $NH_2$ | $NH_2$ | H | (2) | $OC_6H_4(3')CH_3$ |  | 0.78 |  | 0.77 |
| 465 | $NH_2$ | $NH_2$ | H | (3) | $CH_3$ |  | 0.71 | 0.71 | 0.70 |
| 466 | $NH_2$ | $NH_2$ | H | (3) | $CH_2CH(CH_3)_2$ |  | 0.77 |  |  |
| 467 | $NH_2$ | $NH_2$ | H | (3) | 2-Oxazolinyl |  | 0.77 |  | 0.76 |
| 468 | $NH_2$ | $NH_2$ | H | (3) | $CONHC_6H_5$ | 0.75 | 0.78 | 0.77 | 0.76 |
| 469 | $NH_2$ | $NH_2$ | H | (3) | $COOCH_3$ |  |  | 0.75 |  |
| 470 | $NH_2$ | $NH_2$ | H | (3) | $COOC_5H_{11}$ |  | 0.74 | 0.74 | 0.73 |
| 471 | $NH_2$ | $NH_2$ | H | (3) | $COOC_6H_5$ | 0.77 | 0.79 | 0.79 |  |
| 472 | $NH_2$ | $NH_2$ | H | (3) | $COOC_6H_4(3')CH_3$ |  | 0.80 | 0.79 | 0.79 |
| 473 | $NH_2$ | $NH_2$ | H | (3) | $COOC_6H_4(4')Cl$ |  |  | 0.79 | 0.78 |
| 474 | $NH_2$ | $NH_2$ | H | (3) | $COOC_6H_4(4')COOC_5H_{11}$ | 0.77 | 0.79 |  |  |
| 475 | $NH_2$ | $NH_2$ | H | (3) | $OCH_2C_6H_5$ |  | 0.73 |  | 0.72 |
| 476 | $NH_2$ | $NH_2$ | H | (3) | $OC_6H_5$ | 0.75 | 0.78 | 0.78 | 0.77 |
| 477 | $NH_2$ | $NH_2$ | H | (3) | $OC_6H_4(2')OC_2H_5$ | 0.76 |  | 0.78 | 0.77 |
| 478 | $NH_2$ | $NH_2$ | H | (3) | $OC_6H_4(3')CH_3$ |  | 0.78 | 0.78 | 0.77 |
| 479 | $NH_2$ | $NH_2$ | H | (3) | $OC_6H_4(3')F$ | 0.76 | 0.78 | 0.78 |  |
| 480 | $NH_2$ | $NH_2$ | H | (3) | $OC_6H_4(4')CH_3$ | 0.76 | 0.78 | 0.78 |  |
| 481 | $NH_2$ | $NH_2$ | H | (3) | $OC_6H_4(4')C_6H_5$ | 0.77 | 0.79 | 0.79 |  |
| 482 | $NH_2$ | $NH_2$ | H | (3) | $OC_6H_4(4')COOC_5H_{11}$ | 0.75 |  | 0.77 | 0.76 |
| 483 | $NH_2$ | $NH_2$ | H | (3) | O—2-Naphthyl |  |  | 0.79 |  |
| 484 | $NH_2$ | $NH_2$ | H | (3) | CN |  |  | 0.72 |  |
| 485 | $NH_2$ | $NH_2$ | H | (3) | Cl |  | 0.71 |  |  |
| 486 | $NH_2$ | $NH_2$ | H | (6) | $CH_3$ |  | 0.71 |  |  |
| 487 | $NH_2$ | $NH_2$ | H | (6) | $CONHC_6H_5$ | 0.75 | 0.78 |  |  |
| 488 | $NH_2$ | $NH_2$ | H | (6) | $COOCH_3$ | 0.73 | 0.75 | 0.75 |  |
| 489 | $NH_2$ | $NH_2$ | H | (6) | $COOC_6H_5$ | 0.77 | 0.79 | 0.79 | 0.78 |
| 490 | $NH_2$ | $NH_2$ | H | (6) | $COOC_6H_4(4')Cl$ |  | 0.79 |  |  |
| 491 | $NH_2$ | $NH_2$ | H | (6) | $OC_6H_5$ |  | 0.78 |  |  |
| 492 | $NH_2$ | $NH_2$ | H | (6) | CN |  |  | 0.72 |  |

TABLE 2-continued

|  | Y' | Y'' | Y''' | X | Q | S₁ | S₂ | S₃ | S₄ |
|---|---|---|---|---|---|---|---|---|---|
| 493 | H | NH₂ | NH₂ | (2) | CH₃ |  | 0.71 | 0.71 |  |
| 494 | H | NH₂ | NH₂ | (2) | 2-Oxazolinyl |  | 0.77 |  |  |
| 495 | H | NH₂ | NH₂ | (2) | CONHC₆H₅ |  | 0.78 | 0.77 |  |
| 496 | H | NH₂ | NH₂ | (2) | COOC₃H₇ | 0.70 | 0.73 | 0.73 |  |
| 497 | H | NH₂ | NH₂ | (2) | COOC₅H₁₁ |  |  | 0.74 | 0.73 |
| 498 | H | NH₂ | NH₂ | (2) | COOC₆H₅ | 0.77 | 0.79 | 0.79 | 0.78 |
| 499 | H | NH₂ | NH₂ | (2) | COOC₆H₄(3')CH₃ |  |  | 0.79 |  |
| 500 | H | NH₂ | NH₂ | (2) | COOC₆H₄(4')CH₃ |  |  | 0.80 |  |
| 501 | H | NH₂ | NH₂ | (2) | COOC₆H₄(4')COOC₅H₁₁ |  |  | 0.79 |  |
| 502 | H | NH₂ | NH₂ | (6) | CH₂CH(CH₃)₂ |  | 0.77 |  | 0.76 |
| 503 | H | NH₂ | NH₂ | (6) | 2-Oxazolinyl |  | 0.77 | 0.77 |  |
| 504 | H | NH₂ | NH₂ | (6) | CONHC₆H₅ | 0.75 |  | 0.77 | 0.76 |
| 505 | H | NH₂ | NH₂ | (6) | COOC₃H₇ |  | 0.73 | 0.73 |  |
| 506 | H | NH₂ | NH₂ | (6) | COOC₆H₅ | 0.77 | 0.79 | 0.79 | 0.78 |
| 507 | H | NH₂ | NH₂ | (6) | COOC₆H₄(4')OCH₃ | 0.78 |  | 0.80 | 0.79 |
| 508 | H | NH₂ | NH₂ | (6) | COOC₆H₄(4')Cl | 0.77 |  | 0.79 | 0.78 |
| 509 | H | NH₂ | NH₂ | (6) | OC₄H₉ |  |  | 0.73 |  |
| 510 | H | NH₂ | NH₂ | (6) | O(CH₂)₂C₆H₅ |  | 0.75 | 0.75 | 0.74 |
| 511 | H | NH₂ | NH₂ | (6) | OC₆H₅ | 0.75 | 0.78 | 0.78 | 0.77 |
| 512 | H | NH₂ | NH₂ | (6) | OC₆H₄(2')OC₂H₅ |  | 0.78 |  | 0.77 |
| 513 | H | NH₂ | NH₂ | (6) | OC₆H₄(3')CH₃ | 0.76 |  | 0.78 |  |
| 514 | H | NH₂ | NH₂ | (6) | OC₆H₄(3')F | 0.76 |  | 0.78 |  |
| 515 | H | NH₂ | NH₂ | (6) | OC₆H₄(4')CH₃ | 0.76 |  | 0.78 | 0.77 |
| 516 | H | NH₂ | NH₂ | (6) | OC₆H₄(4')OCH₃ |  | 0.79 |  | 0.78 |
| 517 | H | NH₂ | NH₂ | (6) | OC₆H₄(4')SCH₃ |  | 0.78 |  |  |
| 518 | H | NH₂ | NH₂ | (6) | OC₆H₄(4')COOC₅H₁₁ | 0.75 | 0.78 |  | 0.76 |
| 519 | H | NH₂ | NH₂ | (6) | CN |  | 0.72 |  |  |
| 520 | H | NH₂ | NH₂ | (6) | Br |  | 0.72 |  |  |
| 521 | H | NH₂ | NH₂ | (7) | CH₃ |  | 0.71 |  | 0.70 |
| 522 | H | NH₂ | NH₂ | (7) | 2-Oxazolinyl | 0.75 |  | 0.77 | 0.76 |
| 523 | H | NH₂ | NH₂ | (7) | CONHC₆H₅ | 0.75 |  | 0.77 | 0.76 |
| 524 | H | NH₂ | NH₂ | (7) | COOC₅H₁₁ | 0.71 |  | 0.74 | 0.73 |
| 525 | H | NH₂ | NH₂ | (7) | COOC₆H₅ |  | 0.79 |  | 0.78 |
| 526 | H | NH₂ | NH₂ | (7) | COOC₆H₄(3')CH₃ | 0.77 |  | 0.79 | 0.79 |
| 527 | H | NH₂ | NH₂ | (7) | COOC₆H₄(4')CH₃ | 0.78 |  | 0.80 |  |
| 528 | H | NH₂ | NH₂ | (7) | OCH₂C₆H₅ |  | 0.73 |  |  |
| 529 | H | NH₂ | NH₂ | (7) | OC₆H₅ | 0.75 | 0.78 | 0.78 | 0.77 |
| 530 | H | NH₂ | NH₂ | (7) | OC₆H₄(2')Cl | 0.76 |  | 0.78 | 0.77 |
| 531 | H | NH₂ | NH₂ | (7) | OC₆H₄(3')F | 0.76 |  | 0.78 | 0.77 |
| 532 | H | NH₂ | NH₂ | (7) | OC₆H₄(4')CH₃ |  | 0.78 |  | 0.77 |
| 533 | H | NH₂ | NH₂ | (7) | OC₆H₄(4')OCH₃ | 0.76 | 0.79 |  | 0.78 |
| 534 | H | NH₂ | NH₂ | (7) | OC₆H₄(4')C₆H₅ | 0.77 |  | 0.79 |  |
| 535 | H | NH₂ | NH₂ | (7) | OC₆H₄(4')SCH₃ |  | 0.78 | 0.78 | 0.77 |
| 536 | H | NH₂ | NH₂ | (7) | OC₆H₄(4')COOC₂H₅ | 0.76 | 0.78 | 0.78 | 0.77 |
| 537 | H | NH₂ | NH₂ | (7) | OC₆H₄(4')COOC₅H₁₁ |  | 0.78 | 0.77 | 0.76 |
| 538 | H | NH₂ | NH₂ | (7) | OC₆H₄(4')Cl |  | 0.78 | 0.77 |  |
| 539 | H | NH₂ | NH₂ | (7) | O—2-Naphthyl |  | 0.79 |  |  |
| 540 | H | NH₂ | NH₂ | (7) | CN |  | 0.72 | 0.72 |  |
| 541 | H | NH₂ | NH₂ | (7) | Cl |  | 0.71 |  |  |
| 542 | NH₂ | H | NH₂ | (2) | CH₃ |  | 0.71 | 0.71 | 0.70 |
| 543 | NH₂ | H | NH₂ | (2) | 2-Oxazolinyl |  | 0.77 |  | 0.76 |
| 544 | NH₂ | H | NH₂ | (2) | CONHC₆H₅ |  | 0.78 | 0.77 | 0.76 |
| 545 | NH₂ | H | NH₂ | (2) | COOC₅H₁₁ |  | 0.74 | 0.74 | 0.73 |
| 546 | NH₂ | H | NH₂ | (2) | COOC₆H₅ |  | 0.79 |  | 0.78 |
| 547 | NH₂ | H | NH₂ | (2) | COOC₆H₄(4')COOC₅H₁₁ |  | 0.79 |  |  |
| 548 | NH₂ | H | NH₂ | (2) | OCH₃ |  |  | 0.71 | 0.70 |
| 549 | NH₂ | H | NH₂ | (2) | OC₆H₅ |  | 0.78 | 0.78 | 0.77 |
| 550 | NH₂ | H | NH₂ | (2) | OC₆H₄(4')Cl |  | 0.78 | 0.77 |  |
| 551 | NH₂ | H | NH₂ | (3) | CH₃ | 0.68 |  |  | 0.70 |
| 552 | NH₂ | H | NH₂ | (3) | 2-Oxazolinyl | 0.75 |  | 0.77 |  |
| 553 | NH₂ | H | NH₂ | (3) | COOCH₃ |  | 0.75 |  |  |
| 554 | NH₂ | H | NH₂ | (3) | COOC₆H₄(3')CH₃ |  | 0.80 | 0.79 |  |
| 555 | NH₂ | H | NH₂ | (3) | COOC₆H₄(4')C₆H₅ |  | 0.81 | 0.81 | 0.80 |
| 556 | NH₂ | H | NH₂ | (3) | OCH₃ |  | 0.71 | 0.71 |  |
| 557 | NH₂ | H | NH₂ | (3) | OCH₂C₆H₅ |  | 0.73 | 0.73 | 0.72 |
| 558 | NH₂ | H | NH₂ | (3) | OC₆H₅ | 0.75 | 0.78 | 0.78 | 0.77 |
| 559 | NH₂ | H | NH₂ | (3) | OC₆H₄(2')OC₂H₅ | 0.76 | 0.78 |  | 0.77 |
| 560 | NH₂ | H | NH₂ | (3) | OC₆H₄(3')F | 0.76 | 0.78 | 0.78 | 0.77 |
| 561 | NH₂ | H | NH₂ | (3) | OC₆H₄(4')C₆H₅ | 0.77 | 0.79 | 0.79 | 0.78 |
| 562 | NH₂ | H | NH₂ | (3) | OC₆H₄(4')COOC₅H₁₁ | 0.75 | 0.78 | 0.77 | 0.76 |
| 563 | NH₂ | H | NH₂ | (3) | CN |  |  | 0.72 |  |
| 564 | NH₂ | H | NH₂ | (7) | CH₃ |  | 0.71 | 0.71 |  |
| 565 | NH₂ | H | NH₂ | (7) | 2-Oxazolinyl |  | 0.77 | 0.77 |  |
| 566 | NH₂ | H | NH₂ | (7) | CONHC₆H₅ |  | 0.78 | 0.77 |  |
| 567 | NH₂ | H | NH₂ | (7) | COOC₅H₁₁ |  | 0.74 | 0.74 |  |
| 568 | NH₂ | H | NH₂ | (7) | COOC₆H₅ |  | 0.79 | 0.79 |  |
| 569 | NH₂ | H | NH₂ | (7) | COOC₆H₄(3')CH₃ | 0.77 | 0.80 | 0.79 | 0.79 |
| 570 | NH₂ | H | NH₂ | (7) | CN |  | 0.72 |  |  |
| 571 | NH₂ | H | NH₂ | (7) | Cl |  | 0.71 |  |  |
| 572 | NH₂ | H | H | (3) | CH₃ | 0.67 |  | 0.70 |  |
| 573 | NH₂ | H | H | (3) | CH₂CH(CH₃)₂ | 0.74 | 0.76 |  | 0.75 |

TABLE 2-continued

| | Y' | Y'' | Y''' | X | Q | $S_1$ | $S_2$ | $S_3$ | $S_4$ |
|---|---|---|---|---|---|---|---|---|---|
| 574 | $NH_2$ | H | H | (3) | 2-Oxazolinyl | 0.74 | 0.76 | 0.76 | |
| 575 | $NH_2$ | H | H | (3) | $CONHC_6H_5$ | 0.74 | | 0.76 | 0.75 |
| 576 | $NH_2$ | H | H | (3) | $COOCH_3$ | | | 0.74 | 0.73 |
| 577 | $NH_2$ | H | H | (3) | $COOC_3H_7$ | 0.69 | | 0.71 | |
| 578 | $NH_2$ | H | H | (3) | $COOC_5H_{11}$ | 0.70 | 0.73 | | 0.72 |
| 579 | $NH_2$ | H | H | (3) | $COOC_6H_5$ | 0.76 | 0.79 | | 0.77 |
| 580 | $NH_2$ | H | H | (3) | $COOC_6H_4(3')CH_3$ | | 0.79 | 0.79 | 0.78 |
| 581 | $NH_2$ | H | H | (3) | $COOC_6H_4(4')CH_3$ | 0.77 | 0.79 | 0.79 | |
| 582 | $NH_2$ | H | H | (3) | $COOC_6H_4(4')OCH_3$ | 0.77 | 0.79 | 0.79 | |
| 583 | $NH_2$ | H | H | (3) | $COOC_6H_4(4')Cl$ | 0.76 | 0.78 | 0.78 | |
| 584 | $NH_2$ | H | H | (3) | $COOC_6H_4(4')COOC_5H_{11}$ | | 0.78 | 0.78 | |
| 585 | $NH_2$ | H | H | (3) | $COOC_6H_4(4')C_6H_5$ | | 0.80 | 0.80 | 0.79 |
| 586 | $NH_2$ | H | H | (3) | $OCH_3$ | | 0.70 | | |
| 587 | $NH_2$ | H | H | (3) | $OC_4H_9$ | | 0.72 | 0.72 | 0.71 |
| 588 | $NH_2$ | H | H | (3) | $OCH_2C_6H_5$ | | 0.72 | 0.72 | 0.71 |
| 589 | $NH_2$ | H | H | (3) | $O(CH_2)_2C_6H_5$ | | 0.74 | 0.74 | 0.72 |
| 590 | $NH_2$ | H | H | (3) | $OC_6H_5$ | 0.74 | 0.77 | 0.77 | 0.76 |
| 591 | $NH_2$ | H | H | (3) | $OC_6H_4(2')OC_2H_5$ | | 0.77 | | 0.76 |
| 592 | $NH_2$ | H | H | (3) | $OC_6H_4(2')Cl$ | 0.75 | | 0.77 | 0.76 |
| 593 | $NH_2$ | H | H | (3) | $OC_6H_4(3')CH_3$ | 0.75 | 0.77 | 0.77 | 0.76 |
| 594 | $NH_2$ | H | H | (3) | $OC_6H_4(3')Cl$ | 0.76 | 0.78 | 0.78 | 0.77 |
| 595 | $NH_2$ | H | H | (3) | $OC_6H_4(3')F$ | 0.75 | 0.77 | 0.77 | 0.76 |
| 596 | $NH_2$ | H | H | (3) | $OC_6H_4(4')CH_3$ | 0.75 | 0.77 | 0.76 | |
| 597 | $NH_2$ | H | H | (3) | $OC_6H_4(4')OCH_3$ | 0.75 | | 0.78 | 0.77 |
| 598 | $NH_2$ | H | H | (3) | $OC_6H_4(4')C_6H_5$ | | 0.79 | 0.78 | 0.77 |
| 599 | $NH_2$ | H | H | (3) | $OC_6H_4(4')SCH_3$ | | 0.77 | | |
| 600 | $NH_2$ | H | H | (3) | $OC_6H_4(4')COOC_2H_5$ | | | 0.77 | 0.76 |
| 601 | $NH_2$ | H | H | (3) | $OC_6H_4(4')COOC_5H_{11}$ | 0.74 | 0.77 | 0.76 | 0.75 |
| 602 | $NH_2$ | H | H | (3) | $OC_6H_4(4')Cl$ | 0.74 | 0.77 | 0.76 | |
| 603 | $NH_2$ | H | H | (3) | O 2-Naphthyl | | 0.78 | | 0.77 |
| 604 | $NH_2$ | H | H | (3) | CN | 0.68 | 0.71 | 0.71 | |
| 605 | $NH_2$ | H | H | (3) | $CF_3$ | | 0.73 | 0.74 | |
| 606 | $NH_2$ | H | H | (2) | $CH_3$ | | 0.70 | | |
| 607 | $NH_2$ | H | H | (2) | 2-Oxazolinyl | 0.74 | 0.76 | 0.76 | |
| 608 | $NH_2$ | H | H | (2) | $CONHC_6H_5$ | 0.74 | 0.77 | 0.76 | |
| 609 | $NH_2$ | H | H | (2) | $COOC_6H_5$ | 0.76 | 0.79 | | 0.77 |
| 610 | $NH_2$ | H | H | (2) | $COOC_6H_4(3')CH_3$ | | | 0.79 | |
| 611 | $NH_2$ | H | H | (2) | $COOC_6H_4(4')CH_3$ | | 0.79 | 0.79 | 0.78 |
| 612 | $NH_2$ | H | H | (2) | $COOC_6H_4(4')C_6H_5$ | 0.78 | 0.80 | | |
| 613 | $NH_2$ | H | H | (2) | $O(CH_2)_2C_6H_5$ | | 0.74 | 0.74 | 0.72 |
| 614 | $NH_2$ | H | H | (2) | $OC_6H_5$ | | 0.77 | 0.77 | 0.76 |
| 615 | $NH_2$ | H | H | (2) | $OC_6H_4(3')CH_3$ | | 0.77 | 0.77 | 0.76 |
| 616 | $NH_2$ | H | H | (2) | $OC_6H_4(3')F$ | 0.75 | | 0.77 | |
| 617 | $NH_2$ | H | H | (2) | $OC_6H_4(4')C_6H_5$ | | 0.79 | | 0.77 |
| 618 | $NH_2$ | H | H | (2) | $OC_6H_4(4')COOC_5H_{11}$ | 0.74 | 0.77 | 0.76 | 0.75 |
| 619 | $NH_2$ | H | H | (2) | CN | | 0.71 | | |
| 620 | H | H | $NH_2$ | (7) | $CH_3$ | | 0.63 | | |
| 621 | H | H | $NH_2$ | (7) | $CH_2CH(CH_3)_2$ | | 0.70 | | |
| 622 | H | H | $NH_2$ | (7) | 2-Oxazolinyl | | | 0.69 | |
| 623 | H | H | $NH_2$ | (7) | $COOC_3H_7$ | 0.61 | | 0.64 | |
| 624 | H | H | $NH_2$ | (7) | $COOC_5H_{11}$ | | | 0.66 | |
| 625 | H | H | $NH_2$ | (7) | $COOC_6H_5$ | | 0.70 | 0.73 | 0.72 |
| 626 | H | H | $NH_2$ | (7) | $COOC_6H_4(4')CH_3$ | 0.71 | 0.73 | 0.72 | |
| 627 | H | H | $NH_2$ | (7) | $OC_4H_9$ | | 0.65 | | |
| 628 | H | H | $NH_2$ | (7) | CN | | 0.64 | | |
| 629 | H | H | $NH_2$ | (2) | $CH_2CH(CH_3)_2$ | 0.67 | 0.70 | | |
| 630 | H | H | $NH_2$ | (2) | 2-Oxazolinyl | 0.67 | 0.70 | | |
| 631 | H | H | $NH_2$ | (2) | $CONHC_6H_5$ | | 0.70 | | |
| 632 | H | H | $NH_2$ | (2) | $COOC_6H_5$ | 0.70 | 0.73 | 0.72 | 0.71 |
| 633 | H | H | $NH_2$ | (2) | $COOC_6H_4(3')CH_3$ | 0.70 | 0.73 | 0.73 | 0.71 |
| 634 | H | H | $NH_2$ | (2) | $COOC_6H_4(4')COOC_5H_{11}$ | | 0.72 | 0.72 | 0.71 |
| 635 | H | H | $NH_2$ | (2) | CN | | 0.64 | | |
| 636 | H | $NH_2$ | H | (6) | $CH_3$ | 0.67 | 0.70 | | |
| 637 | H | $NH_2$ | H | (6) | $CH_2CH(CH_3)_2$ | | 0.76 | 0.76 | |
| 638 | H | $NH_2$ | H | (6) | 2-Oxazolinyl | | 0.76 | 0.76 | |
| 639 | H | $NH_2$ | H | (6) | $COOC_6H_5$ | 0.76 | 0.79 | 0.78 | 0.77 |
| 640 | H | $NH_2$ | H | (6) | $COOC_6H_4(4')C_6H_5$ | 0.78 | | 0.80 | 0.79 |
| 641 | H | $NH_2$ | H | (6) | CN | | 0.71 | 0.71 | |
| 642 | H | $NH_2$ | H | (6) | Cl | | 0.70 | 0.70 | |
| 643 | H | $NH_2$ | H | (2) | $CH_3$ | | 0.70 | 0.70 | |
| 644 | H | $NH_2$ | H | (2) | $CH_2CH(CH_3)_2$ | | 0.76 | | |
| 645 | H | $NH_2$ | H | (2) | $COOC_5H_{11}$ | | 0.73 | 0.73 | |
| 646 | H | $NH_2$ | H | (2) | $COOC_6H_5$ | 0.76 | 0.79 | 0.78 | 0.77 |
| 647 | H | $NH_2$ | H | (2) | $COOC_6H_4(4')OCH_3$ | | 0.79 | 0.79 | |
| 648 | H | $NH_2$ | H | (2) | $COOC_6H_4(4')C_6H_5$ | 0.78 | 0.80 | | |
| 649 | H | $NH_2$ | H | (2) | $OCH_3$ | | 0.70 | | |
| 650 | H | $NH_2$ | H | (2) | CN | | 0.71 | | |
| 651 | $NH_2$ | H | H | (3) | $CONHCH_3$ | 0.69 | 0.75 | 0.76 | 0.73 |
| 652 | $NH_2$ | H | H | (3) | $CONHC_4H_9$ | 0.70 | 0.76 | 0.77 | 0.74 |
| 653 | $NH_2$ | H | H | (3) | $CONHC_5H_{11}$ | 0.71 | 0.76 | 0.77 | 0.75 |
| 654 | $NH_2$ | H | H | (3) | $CO-S-C_6H_5$ | 0.74 | | | |

TABLE 2-continued

| | Y' | Y'' | Y''' | X | Q | $S_1$ | $S_2$ | $S_3$ | $S_4$ |
|---|---|---|---|---|---|---|---|---|---|
| 655 | $NH_2$ | H | H | (3) | $CO-S-C_6H_4(4')CH_3$ | | | 0.76 | |
| 656 | $NH_2$ | H | H | (3) | $CO-S-C_6H_4(4')Cl$ | | 0.77 | | |
| 657 | $NH_2$ | H | H | (3) | $CO-S-C_6H_4(4')C(CH_3)_3$ | | | | 0.75 |
| 658 | SAr | H | H | (2) | $CONHC_5H_{11}$ | 0.73 | 0.78 | 0.77 | 0.76 |
| 659 | SAr | H | H | (2) | $CO-S-C_6H_4(4')CH_3$ | | | 0.77 | |
| 660 | SAr | H | H | (2) | $CH_2C_6H_5$ | 0.74 | 0.75 | 0.76 | 0.73 |
| 661 | $NH_2$ | H | H | (3) | $CH_2C_6H_5$ | 0.73 | 0.73 | | |
| 662 | $NH_2$ | H | H | (3) | $CH_2C_6H_4(4')CH_3$ | | 0.74 | 0.75 | |
| 663 | $NH_3$ | H | H | (3) | N—N / O \—$C_6H_5$ | 0.73 | | 0.75 | 0.74 |
| 664 | $NH_3$ | H | H | (3) | N—N / S \—$C_6H_5$ | 0.72 | | 0.75 | 0.73 |
| 665 | SAR | H | H | (2) | N—N / O \—$C_6H_5$ | 0.73 | 0.77 | | 0.75 |
| 666 | $NH_3$ | SAr | SAr | (3) | N—N / O \—$C_6H_5$ | 0.74 | 0.80 | | 0.77 |

Table 3 below relates to dyestuffs of the formula

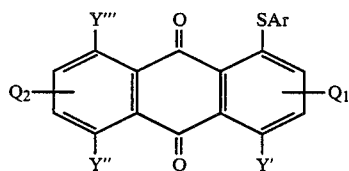

$X_1$ indicates the position of the substituent $Q_1$ and $X_2$ indicates the position of the substituent $Q_2$.

In other respects the information given for Table 2 applies.

TABLE 3

| | Y' | Y'' | Y''' | $X_1$ | $Q_1$ | $X_2$ | $Q_2$ | $S_1$ | $S_2$ | $S_3$ | $S_4$ |
|---|---|---|---|---|---|---|---|---|---|---|---|
| 667 | H | SAr | H | (2) | $COOC_6H_5$ | (6) | $COOC_6H_5$ | 0.78 | 0.80 | 0.81 | 0.79 |
| 668 | H | SAr | H | (2) | $COOC_5H_{11}$ | (6) | $COOC_5H_{11}$ | 0.76 | 0.81 | 0.80 | 0.78 |
| 669 | H | H | SAr | (2) | $COOC_6H_4(3')F$ | (7) | $COOC_6H_{3'})F$ | 0.69 | 0.75 | 0.74 | 0.73 |
| 670 | H | H | SAr | (2) | $COOC_5H_{11}$ | (7) | $COOC_5H_{11}$ | 0.67 | 0.73 | 0.72 | 0.70 |
| 671 | $NH_2$ | SAr | $NH_2$ | (3) | $COOC_6H_5$ | (7) | $COOC_6H_5$ | 0.78 | 0.80 | 0.81 | 0.79 |
| 672 | $NH_2$ | SAr | $NH_2$ | (3) | $COOC_5H_{11}$ | (7) | $COOC_5H_{11}$ | 0.75 | | 0.79 | |
| 673 | $NH_2$ | $NH_2$ | SAr | (3) | $COOC_6H_5$ | (6) | $COOC_6H_5$ | 0.77 | 0.79 | | 0.76 |
| 674 | $NH_2$ | $NH_2$ | SAr | (3) | $COOC_5H_{11}$ | (6) | $COOC_5H_{11}$ | 0.75 | 0.77 | 0.78 | |

We claim:

1. Anthraquinone dyestuffs of the formula

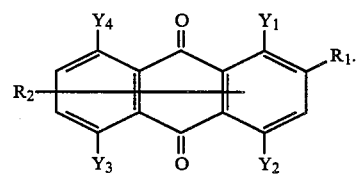

in which $R_1$ represents —CO—X—alkyl, —CO—X—aralkyl, —CO—X—aryl, —O—aryl, —CF$_3$ or a heterocyclic radical, said heterocyclic radical being an unsubstituted or substituted, fused or unfused ring carrying a 5-ring or a 6-ring heterocyclic structure of the oxazole, oxdiazole, thiazole, thiadiazole, imidazole, triazole, oxazoline or dihydro-H-oxazine series, and $R_2$ represents H, alkyl, aralkyl, —CO—X—alkyl, —CO—X—aralkyl, —CO—X—aryl, —O—alkyl, —O—aralkyl, —O—aryl, —CN, —NO$_2$, —CF$_3$, halogen or a heterocyclic radical, said heterocyclic radical being an unsubstituted or substituted, fused or unfused ring carrying a 5-ring or a 6-ring heterocyclic structure of the oxazole, oxdiazole, thiazole, thiadiazole, imidazole, triazole, oxazoline or dihydro-H-oxazine series, and X represents O, S, NH or a direct bond and $Y_1$, $Y_2$, $Y_3$ and $Y_4$ denotes hydrogen, NH$_2$, OH, halogen, or NO$_2$ or an arylmercapto group and at least one of the substituents $Y_1$, $Y_2$, $Y_3$, or $Y_4$ representing an arylmercapto group, the alkyl, aryl, aralkyl and heterocyclic radicals mentioned for $R_1$ and $Y_1$, $Y_2$, $Y_3$ and $Y_4$ being substituted or unsubstituted and the alkyl chains being non-interrupted or interrupted by 1, 2 or 3 non-adjacent oxygen atoms.

2. Anthraquinone dyestuffs of the formula

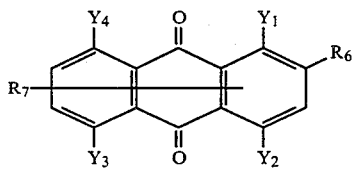

(II)

in which $R_6$ represents alkyl, aralkyl, —CO—X—alkyl, —CO—X—aralkyl, —CO—X—aryl, —O—aryl, —CF$_3$, or a heterocyclic radical, said heterocyclic radical being an unsubstituted or substituted, fused or unfused ring carrying a 5-ring or a 6-ring heterocyclic structure of the oxazole, oxdiazole, thiazole, thiadiazole, imidazole, triazole, oxazoline or dihydro-H-oxazine series, and $R_7$ represents H, alkyl, aralkyl, —CO—X—alkyl, —CO—X—aralkyl, —CO—X—aryl, —O—aryl, —CN, —NO$_2$ —CF$_3$, halogen or a heterocyclic radical, said heterocyclic radical being an unsubstituted, fused or unfused ring carrying a 5-ring or a 6-ring heterocyclic structure of the oxazole, oxdiazole, thiazole, thiadiazole, imidazole, triazole, oxazoline or dihydro-H-oxazine series, and X representing O, S, NH or a direct bond and $Y_1$, $Y_2$, $Y_3$ and $Y_4$ represent the following combinations:

| $Y_1$ | $Y_2$ | $Y_3$ | $Y_4$ |
|---|---|---|---|
| S—Ar | S—Ar | S—Ar | NH$_2$ |
| S—Ar | S—Ar | NH$_2$ | S—Ar |
| S—Ar | NH$_2$ | S—Ar | S—Ar |
| NH$_2$ | S—Ar | S—Ar | S—Ar |
| S—Ar | S—Ar | S—Ar | H |
| S—Ar | S—Ar | H | S—Ar |
| S—Ar | H | S—Ar | S—Ar |
| H | S—Ar | S—Ar | S—Ar |
| S—Ar | S—Ar | NH$_2$ | NH$_2$ |
| NH$_2$ | NH$_2$ | S—Ar | S—Ar |
| S—Ar | NH$_2$ | NH$_2$ | S—Ar |
| NH$_2$ | S—Ar | S—Ar | NH$_2$ |
| S—Ar | NH$_2$ | S—Ar | NH$_2$ |
| NH$_2$ | S—Ar | NH$_2$ | S—Ar |
| S—Ar | S—Ar | NH$_2$ | OH |
| S—Ar | S—Ar | OH | NH$_2$ |
| NH$_2$ | OH | S—Ar | S—Ar |
| OH | NH$_2$ | S—Ar | S—Ar |
| S—Ar | NH$_2$ | S—Ar | OH |
| NH$_2$ | S—Ar | OH | S—Ar |
| S—Ar | OH | S—Ar | NH$_2$ |
| OH | S—Ar | NH$_2$ | S—Ar |
| S—Ar | S—Ar | NH$_2$ | Hal |
| S—Ar | S—Ar | Hal | NH$_2$ |
| NH$_2$ | Hal | S—Ar | S—Ar |
| Hal | NH$_2$ | S—Ar | S—Ar |
| S—Ar | NH$_2$ | S—Ar | Hal |
| NH$_2$ | S—Ar | Hal | S—Ar |
| S—Ar | Hal | S—Ar | NH$_2$ |
| Hal | S—Ar | NH$_2$ | S—Ar |
| S—Ar | S—Ar | NH$_2$ | H |
| S—Ar | S—Ar | H | NH$_2$ |
| NH$_2$ | H | S—Ar | S—Ar |
| H | NH$_2$ | S—Ar | S—Ar |
| S—Ar | NH$_2$ | S—Ar | H |
| NH$_2$ | S—Ar | H | S—Ar |
| S—Ar | H | S—Ar | NH$_2$ |
| H | S—Ar | NH$_2$ | S—Ar |
| S—Ar | OH | S—Ar | Hal |
| OH | S—Ar | Hal | S—Ar |
| S—Ar | Hal | S—Ar | OH |
| Hal | S—Ar | OH | S—Ar |
| S—Ar | S—Ar | OH | H |
| S—Ar | S—Ar | H | OH |
| OH | H | S—Ar | S—Ar |

| $Y_1$ | $Y_2$ | $Y_3$ | $Y_4$ |
|---|---|---|---|
| H | OH | S—Ar | S—Ar |
| S—Ar | OH | S—Ar | H |
| OH | S—Ar | H | S—Ar |
| S—Ar | H | S—Ar | OH |
| H | S—Ar | OH | S—Ar |
| S—Ar | Hal | S—Ar | H |
| Hal | S—Ar | H | S—Ar |
| S—Ar | H | S—Ar | Hal |
| H | S—Ar | Hal | S—Ar |
| S—Ar | S—Ar | H | H |
| H | H | S—Ar | S—Ar |
| S—Ar | H | S—Ar | H |
| H | S—Ar | H | S—Ar |
| S—Ar | NH$_2$ | NH$_2$ | NH$_2$ |
| NH$_2$ | S—Ar | NH$_2$ | NH$_2$ |
| NH$_2$ | NH$_2$ | S—Ar | NH$_2$ |
| NH$_2$ | NH$_2$ | NH$_2$ | S—Ar |
| S—Ar | NH$_2$ | NH$_2$ | OH |
| NH$_2$ | S—Ar | OH | NH$_2$ |
| NH$_2$ | OH | S—Ar | NH$_2$ |
| OH | NH$_2$ | NH$_2$ | S—Ar |
| S—Ar | OH | NH$_2$ | NH$_2$ |
| OH | S—Ar | NH$_2$ | NH$_2$ |
| NH$_2$ | NH$_2$ | S—Ar | OH |
| NH$_2$ | NH$_2$ | OH | S—Ar |
| S—Ar | NH$_2$ | OH | NH$_2$ |
| NH$_2$ | S—Ar | NH$_2$ | OH |
| OH | NH$_2$ | S—Ar | NH$_2$ |
| NH$_2$ | OH | NH$_2$ | S—Ar |
| S—Ar | NH$_2$ | NO$_2$ | NH$_2$ |
| NH$_2$ | S—Ar | NH$_2$ | NO$_2$ |
| NO$_2$ | NH$_2$ | S—Ar | NH$_2$ |
| NH$_2$ | NO$_2$ | NH$_2$ | S—Ar |
| S—Ar | NH$_2$ | NH$_2$ | H |
| NH$_2$ | S—Ar | H | NH$_2$ |
| NH$_2$ | H | S—Ar | NH$_2$ |
| H | NH$_2$ | NH$_2$ | S—Ar |
| S—Ar | H | NH$_2$ | NH$_2$ |
| H | S—Ar | NH$_2$ | NH$_2$ |
| NH$_2$ | NH$_2$ | S—Ar | H |
| NH$_2$ | NH$_2$ | H | S—Ar |
| S—Ar | NH$_2$ | H | NH$_2$ |
| NH$_2$ | S—Ar | NH$_2$ | H |
| H | NH$_2$ | S—Ar | NH$_2$ |
| NH$_2$ | H | NH$_2$ | S—Ar |
| S—Ar | NH$_2$ | H | H |
| NH$_2$ | S—Ar | H | H |
| H | H | S—Ar | NH$_2$ |
| H | H | NH$_2$ | S—Ar |
| S—Ar | H | NH$_2$ | H |
| H | S—Ar | H | NH$_2$ |
| NH$_2$ | H | S—Ar | H |
| H | NH$_2$ | H | S—Ar | wherein Ar denotes aryl and Hal denotes halogen.

3. Anthraquinone dyestuffs of the formulas

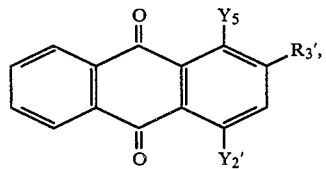

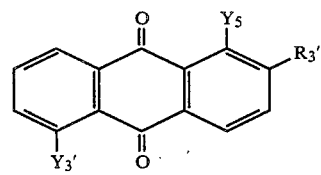

and

-continued

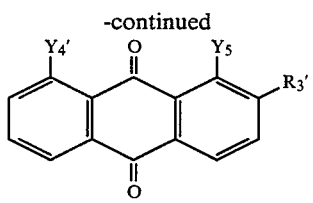

in which
R₃ is

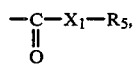

—OR₄ or —SR₄,
R₃ is

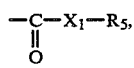

$Y_2$, $Y_3$ and $Y_4'$ denote unsubstituted or substituted arylmercapto, $Y_5$ denotes —NH₂, —OH or unsubstituted or substituted arylmercapto, $R_4$ and $R_5$ denote unsubstituted or substituted alkyl which is uninterrupted or interrupted in the C chain by one or more O and/or S atoms, or denotes unsubstitued or substituted aryl, $R_4'$ denotes unsubstituted or substituted aryl and $X_1$ denotes O, S or —NH.

4. Anthraquinone dyestuffs of the formulas

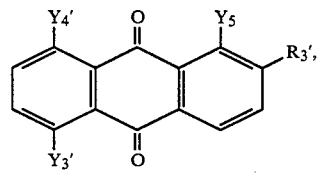

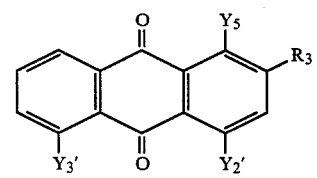

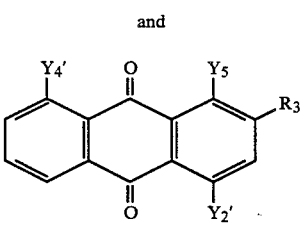

in which
$R_3$, $R_3'$, $Y_2'$, $Y_3'$, $Y_4'$ and $Y_5$ have the meanings indicated in claim 1 and
$Y_3'$ denotes unsubstituted or substituted arylmercapto.

5. Anthraquinone dyestuffs of the formula

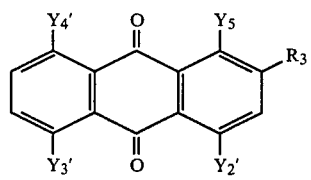

in which
$R_3$, $Y_2'$, $Y_3'$, $Y_4'$ and $Y_5$ have the meanings indicated in claims 3 and 4.

6. Anthraquinone dyestuffs of the formulas

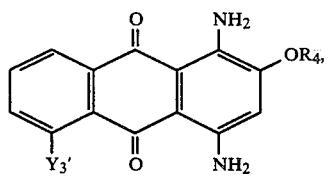

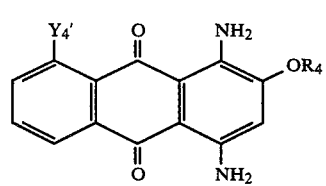

and

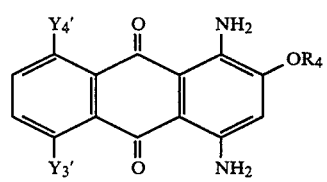

in which
$R_4$, $Y_3'$ and $Y_4'$ have the meanings indicated in claims 3 and 4.

7. Anthraquinone dyestuffs of the formulas

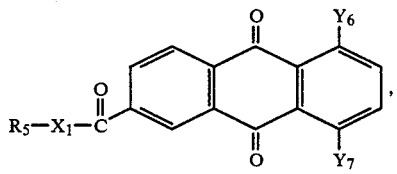

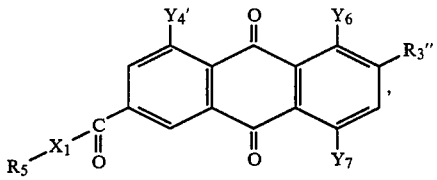

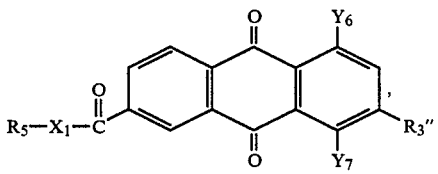

in which
$R_3''$ denotes —OR₄ or —SR₄,

R4 and R5 denote unsubstituted or substituted alkyl or unsubstituted or substituted aryl and $Y_6$ and $Y_7$ denote —$NH_2$, —OH or —$SR_4$, one of the two radicals $Y_6$ and $Y_7$ being —$SR_4$.

8. In a method of dyeing synthetic polymers, wherein the improvement comprises conducting said dyeing with dyestuffs according to claim 1.

9. Dichroic material containing about 0.01 to about 30% by weight of at least one dyestuff according to claim 3.

10. Dichroic material containing about 0.01 to about 30% by weight of at least one dyestuff according to claim 4.

11. Dichroic material containing about 0.01 to about 30% by weight of at least one dyestuff according to claim 5.

12. Dichroic material containing about 0.01 to about 30% by weight of at least one dyestuff according to claim 6.

13. Dichroic material containing about 0.01 to about 30% by weight of at least one dyestuff according to claim 7.

14. Dichroic material containing about 0.01 to about 30% by weight of at least one dyestuff of the formula

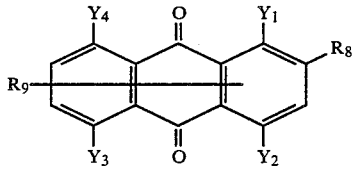

in which $R_8$ represents —CO—X—alkyl, —CO—X—aralkyl, —CO—X—aryl, —O—alkyl, —O—aralkyl, —O—aryl, —$CF_3$, or a heterocyclic radical, said heterocyclic radical being an unsubstituted or substituted, fused or unfused ring carrying a 5-ring or a 6-ring heterocyclic structure of the oxazole, oxdiazole, thiazole, thiadiazole, imidazole, triazole, oxazoline, or dihydro-H-oxazine series, and $R_9$ represents H or $R_8$, X represents O, S, NH or a direct bond and $Y_1$, $Y_2$, $Y_3$ and $Y_4$ represent the following combinations:

| $Y_1$ | $Y_2$ | $Y_3$ | $Y_4$ |
|---|---|---|---|
| S—Ar | S—Ar | S—Ar | $NH_2$ |
| S—Ar | S—Ar | $NH_2$ | S—Ar |
| S—Ar | $NH_2$ | S—Ar | S—Ar |
| $NH_2$ | S—Ar | S—Ar | S—Ar |
| S—Ar | S—Ar | S—Ar | H |
| S—Ar | S—Ar | H | S—Ar |
| S—Ar | H | S—Ar | S—Ar |
| H | S—Ar | S—Ar | S—Ar |
| S—Ar | S—Ar | $NH_2$ | $NH_2$ |
| $NH_2$ | $NH_2$ | S—Ar | S—Ar |
| S—Ar | $NH_2$ | $NH_2$ | S—Ar |
| $NH_2$ | S—Ar | S—Ar | $NH_2$ |
| S—Ar | $NH_2$ | S—Ar | $NH_2$ |
| $NH_2$ | S—Ar | $NH_2$ | S—Ar |
| S—Ar | S—Ar | $NH_2$ | OH |
| S—Ar | S—Ar | OH | $NH_2$ |
| $NH_2$ | OH | S—Ar | S—Ar |
| OH | $NH_2$ | S—Ar | S—Ar |
| S—Ar | $NH_2$ | S—Ar | OH |
| $NH_2$ | S—Ar | OH | S—Ar |
| S—Ar | OH | S—Ar | $NH_2$ |
| OH | S—Ar | $NH_2$ | S—Ar |
| S—Ar | S—Ar | $NH_2$ | Hal |

-continued

| $Y_1$ | $Y_2$ | $Y_3$ | $Y_4$ |
|---|---|---|---|
| S—Ar | S—Ar | Hal | $NH_2$ |
| $NH_2$ | Hal | S—Ar | S—Ar |
| Hal | $NH_2$ | S—Ar | S—Ar |
| S—Ar | $NH_2$ | S—Ar | Hal |
| $NH_2$ | S—Ar | Hal | S—Ar |
| S—Ar | Hal | S—Ar | $NH_2$ |
| Hal | S—Ar | $NH_2$ | S—Ar |
| S—Ar | S—Ar | $NH_2$ | H |
| S—Ar | S—Ar | H | $NH_2$ |
| $NH_2$ | H | S—Ar | S—Ar |
| H | $NH_2$ | S—Ar | S—Ar |
| S—Ar | $NH_2$ | S—Ar | H |
| $NH_2$ | S—Ar | H | S—Ar |
| S—Ar | H | S—Ar | $NH_2$ |
| H | S—Ar | $NH_2$ | S—Ar |
| S—Ar | OH | S—Ar | Hal |
| OH | S—Ar | Hal | S—Ar |
| S—Ar | Hal | S—Ar | OH |
| Hal | S—Ar | OH | S—Ar |
| S—Ar | S—Ar | OH | H |
| S—Ar | S—Ar | H | OH |
| OH | H | S—Ar | S—Ar |
| H | OH | S—Ar | S—Ar |
| S—Ar | OH | S—Ar | H |
| OH | S—Ar | H | S—Ar |
| S—Ar | H | S—Ar | OH |
| H | S—Ar | OH | S—Ar |
| S—Ar | Hal | S—Ar | H |
| Hal | S—Ar | H | S—Ar |
| S—Ar | H | S—Ar | Hal |
| H | S—Ar | Hal | S—Ar |
| S—Ar | S—Ar | H | H |
| H | H | S—Ar | S—Ar |
| S—Ar | H | S—Ar | H |
| H | S—Ar | H | S—Ar |
| S—Ar | $NH_2$ | $NH_2$ | $NH_2$ |
| $NH_2$ | S—Ar | $NH_2$ | $NH_2$ |
| $NH_2$ | $NH_2$ | S—Ar | $NH_2$ |
| $NH_2$ | $NH_2$ | $NH_2$ | S—Ar |
| S—Ar | $NH_2$ | $NH_2$ | OH |
| $NH_2$ | S—Ar | OH | $NH_2$ |
| $NH_2$ | OH | S—Ar | $NH_2$ |
| OH | $NH_2$ | $NH_2$ | S—Ar |
| S—Ar | OH | $NH_2$ | $NH_2$ |
| OH | S—Ar | $NH_2$ | $NH_2$ |
| $NH_2$ | $NH_2$ | S—Ar | OH |
| $NH_2$ | $NH_2$ | OH | S—Ar |
| S—Ar | $NH_2$ | OH | $NH_2$ |
| $NH_2$ | S—Ar | $NH_2$ | OH |
| OH | $NH_2$ | S—Ar | $NH_2$ |
| $NH_2$ | OH | $NH_2$ | S—Ar |
| S—Ar | $NH_2$ | $NO_2$ | $NH_2$ |
| $NH_2$ | S—Ar | $NH_2$ | $NO_2$ |
| $NO_2$ | $NH_2$ | S—Ar | $NH_2$ |
| $NH_2$ | $NO_2$ | $NH_2$ | S—Ar |
| S—Ar | $NH_2$ | $NH_2$ | H |
| $NH_2$ | $NH_2$ | H | $NH_2$ |
| $NH_2$ | H | S—Ar | $NH_2$ |
| H | $NH_2$ | $NH_2$ | S—Ar |
| S—Ar | H | $NH_2$ | $NH_2$ |
| H | S—Ar | $NH_2$ | $NH_2$ |
| $NH_2$ | $NH_2$ | S—Ar | H |
| $NH_2$ | $NH_2$ | H | S—Ar |
| S—Ar | $NH_2$ | H | $NH_2$ |
| $NH_2$ | S—Ar | $NH_2$ | H |
| H | $NH_2$ | S—Ar | $NH_2$ |
| $NH_2$ | H | $NH_2$ | S—Ar |
| S—Ar | $NH_2$ | H | H |
| $NH_2$ | S—Ar | H | H |
| H | H | S—Ar | $NH_2$ |
| H | H | $NH_2$ | S—Ar |
| S—Ar | H | $NH_2$ | H |
| H | $NH_2$ | S—Ar | H |
| H | S—Ar | H | $NH_2$ |
| $NH_2$ | H | S—Ar | H |
| H | $NH_2$ | H | S—Ar | wherein Ar denotes aryl and Hal denotes halogen.

15. Dichroic material containing about 0.01 to about 30% by weight of at least one dyestuff according to claim 1, wherein $R_1$ has the given meaning.

16. Dichroic material containing about 0.01 to about 30% by weight of at least one dyestuff according to claim 2, wherein $R_6$ has the given meaning.

* * * * *